United States Patent
Liu et al.

(10) Patent No.: US 12,200,666 B2
(45) Date of Patent: Jan. 14, 2025

(54) METHOD AND APPARATUS FOR TRANSMITTING OR RECEIVING CENTRIC FREQUENCY DOMAIN RESOURCE ALLOCATION

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/727,408

(22) Filed: Apr. 22, 2022

(65) Prior Publication Data
US 2023/0345420 A1    Oct. 26, 2023

(51) Int. Cl.
 *H04W 72/02*     (2009.01)
 *H04W 72/04*     (2023.01)
 *H04W 72/0453*   (2023.01)
 *H04W 72/20*     (2023.01)
 *H04W 92/18*     (2009.01)

(52) U.S. Cl.
CPC ....... *H04W 72/02* (2013.01); *H04W 72/0453* (2013.01); *H04W 72/20* (2023.01); *H04W 92/18* (2013.01)

(58) Field of Classification Search
CPC .... H04L 5/00; H04W 72/02; H04W 72/0453; H04W 72/20; H04W 76/14; H04W 92/18
See application file for complete search history.

(56) References Cited

U.S. PATENT DOCUMENTS

| | | | | |
|---|---|---|---|---|
| 2022/0070906 A1* | 3/2022 | Wang | ............... | H04L 1/1861 |
| 2022/0094472 A1* | 3/2022 | Hwang | ............... | H04L 1/0055 |
| 2023/0090640 A1* | 3/2023 | Wu | ............... | H04L 5/001 |
| | | | | 370/350 |
| 2023/0269703 A1* | 8/2023 | Liu | ............... | H04W 72/0453 |
| | | | | 370/329 |
| 2023/0319744 A1* | 10/2023 | Liu | ............... | H04W 72/044 |
| | | | | 370/350 |

FOREIGN PATENT DOCUMENTS

| WO | WO-2020197300 A1 | 10/2020 |
|---|---|---|
| WO | WO-2021234167 A1 | 11/2021 |

OTHER PUBLICATIONS

International Search Report and Written Opinion—PCT/US2023/065700—ISA/EPO—Jul. 10, 2023.

* cited by examiner

*Primary Examiner* — Alpus Hsu
(74) *Attorney, Agent, or Firm* — Holland & Hart LLP

(57) ABSTRACT

Methods, systems, and devices for wireless communication are described. A user equipment (UE) may transmit signaling that includes an indication of a resource block set configuration to one or more sidelink UE, the resource block set configuration based at least in part on a type of sidelink communications to be performed and from a set of available resource block set configurations that comprises at least a minimum overlapping frequency resource block set configuration. The UE may perform the sidelink communications with the one or more sidelink UE according to the resource block set configuration.

30 Claims, 17 Drawing Sheets

METHOD AND APPARATUS FOR TRANSMITTING OR RECEIVING CENTRIC FREQUENCY DOMAIN RESOURCE ALLOCATION

FIELD OF TECHNOLOGY

The present disclosure relates to wireless communication, and particularly to transmit or receive centric frequency domain resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

A UE may perform sidelink communications with one or more other UEs. In examples of a sidelink communication Mode 2, one sidelink UE may autonomously schedule sidelink communication resources with the other sidelink UE (for example, without receiving scheduling information from the network entity). In this Mode 2 situation, the scheduling sidelink UE (e.g., a transmitting sidelink UE (Tx UE)) may be communicating with other sidelink UE having different settings, capabilities, etc. Further, different sidelink UE may use different subbands for communications, such as different UE may use different subset(s) of subband(s) (which may be partially overlapping in the frequency domain in some examples), different resource block (RB) set guard band settings, and the like. Sidelink UEs with different RB set configurations may become an issue for the scheduling sidelink UE because the frequency domain resource allocation (FDRA) configuration/interpretation may be based on the RB set configuration.

SUMMARY

The described techniques relate to improved methods, systems, devices, and apparatuses that support transmit or receive centric frequency domain resource allocation (FDRA). For example, the described techniques provide for various modes for resource block (RB) set configurations between sidelink user equipment (UE) to improve FDRA signaling. One mode includes a minimum RB set configuration based on the minimum set of overlapping RBs among all possible RB set configurations (e.g., per a 20 MHz subband). The minimum RB set configuration mode improves sidelink communications by ensuring that, at a minimum, the transmitting sidelink UE (Tx UE) and the receiving sidelink UE (Rx UE) are monitoring the RBs that overlap within the frequency domain. Another mode includes a transmit-centric (Tx-centric) RB set configuration based on the transmitting sidelink UE's (Tx UE) assumptions/configurations. The Tx-centric RB set configuration improves sidelink communications, such as groupcast and/or broadcast sidelink communications, by the Tx UE by maximizing use of the RBs available to the Tx UE. Another mode includes a receiver-centric (Rx-centric) RB set configuration based on the receiving sidelink UE's (Rx UE) assumptions/configurations. The Rx-centric RB set configuration improve sidelink communications for the Rx UE by maximizing use of the RBs available to the Rx UE. Accordingly, the Tx UE may transmit or otherwise provide an indication (e.g., implicit or explicit) of the RB set configuration to one or more Rx UEs. The RB set configuration may be selected based on the type of sidelink communications being performed and may be from the available RB set configurations (e.g., from the minimum RB set configuration, the Tx-centric RB set configuration, or the Rx-centric RB set configuration). The sidelink UE may perform the sidelink communications according to the indicated RB set configuration.

A method for wireless communication at a UE is described. The method may include transmitting signaling that includes an indication of a RB set configuration to one or more sidelink UE, the RB set configuration based on a type of sidelink communications to be performed and from a set of available RB set configurations that includes at least a minimum overlapping frequency RB set configuration and performing the sidelink communications with the one or more sidelink UE according to the RB set configuration.

An apparatus for wireless communication at a UE is described. The apparatus may include a processor, memory coupled with the processor, and instructions stored in the memory. The instructions may be executable by the processor to cause the apparatus to transmit signaling that includes an indication of a RB set configuration to one or more sidelink UE, the RB set configuration based on a type of sidelink communications to be performed and from a set of available RB set configurations that includes at least a minimum overlapping frequency RB set configuration and perform the sidelink communications with the one or more sidelink UE according to the RB set configuration.

Another apparatus for wireless communication at a UE is described. The apparatus may include means for transmitting signaling that includes an indication of a RB set configuration to one or more sidelink UE, the RB set configuration based on a type of sidelink communications to be performed and from a set of available RB set configurations that includes at least a minimum overlapping frequency RB set configuration and means for performing the sidelink communications with the one or more sidelink UE according to the RB set configuration.

A non-transitory computer-readable medium storing code for wireless communication at a UE is described. The code may include instructions executable by a processor to transmit signaling that includes an indication of a RB set configuration to one or more sidelink UE, the RB set configuration based on a type of sidelink communications to be performed and from a set of available RB set configurations that includes at least a minimum overlapping frequency RB set configuration and perform the sidelink communications with the one or more sidelink UE according to the RB set configuration.

Some examples of the method, apparatuses, and non-transitory computer-readable medium described herein may further include operations, features, means, or instructions for identifying, within a subband, a set of RBs having frequencies that overlap within each RB set configuration in the available RB set configurations and selecting the set of RBs for the RB set configuration based on the identifying, where the minimum overlapping frequency RB set configuration includes the set of RBs having frequencies that overlap within the subband.

Some examples of the method, apparatuses, and non-transitory computer-readable medium described herein may further include operations, features, means, or instructions for performing the sidelink communications includes transmitting a SCI message, a multicast message, a groupcast message, a radio resource control (RRC) message, or any combination thereof, using the set of RBs.

Some examples of the method, apparatuses, and non-transitory computer-readable medium described herein may further include operations, features, means, or instructions for configuring a physical sidelink control channel (PSCCH) for transmissions within the set of RBs based on the set of RBs having the frequencies that overlap within the subband.

Some examples of the method, apparatuses, and non-transitory computer-readable medium described herein may further include operations, features, means, or instructions for configuring a portion of a physical sidelink shared channel (PSSCH) for transmissions of a SCI message within the set of RBs based on the set of RBs having the frequencies that overlap within the subband.

Some examples of the method, apparatuses, and non-transitory computer-readable medium described herein may further include operations, features, means, or instructions for identifying a set of RBs of the UE available for transmitting a broadcast transmission, a groupcast transmission, or both, where the type of sidelink communications include the broadcast transmission, the groupcast transmission, or both and selecting the set of RBs of the UE for the RB set configuration based on the type of sidelink communications, where the set of RBs may be associated with a transmitter-centric RB set configuration of the available RB set configurations.

Some examples of the method, apparatuses, and non-transitory computer-readable medium described herein may further include operations, features, means, or instructions for identifying the set of RBs of the UE based on an active bandwidth part of the UE.

Some examples of the method, apparatuses, and non-transitory computer-readable medium described herein may further include operations, features, means, or instructions for receiving, from a sidelink UE, an indication of a requested RB set configuration and selecting the requested RB set configuration as the RB set configuration based on the indication.

In some examples of the method, apparatuses, and non-transitory computer-readable medium described herein, providing the indication may include operations, features, means, or instructions for identifying, based on the type of sidelink communications to be performed, a RB set configuration indication status for the one or more sidelink UE and selecting the minimum overlapping frequency RB set configuration as the RB set configuration based on the RB set configuration indication status.

In some examples of the method, apparatuses, and non-transitory computer-readable medium described herein, providing the indication may include operations, features, means, or instructions for configuring one or more SCI messages to indicate the RB set configuration, wherein the signaling comprises the one or more SCI messages.

Some examples of the method, apparatuses, and non-transitory computer-readable medium described herein may further include operations, features, means, or instructions for determining an updated type of sidelink communications to be performed for subsequent sidelink communications to be performed and transitioning from the RB set configuration to an updated RB set configuration for the subsequent sidelink communications based on the updated type of sidelink communications.

In some examples of the method, apparatuses, and non-transitory computer-readable medium described herein, the type of sidelink communications being performed includes at least one of a unicast sidelink communication, a broadcast sidelink communication, a groupcast sidelink communication, a multicast sidelink communication, or a combination thereof.

A method for wireless communication at a UE is described. The method may include receiving signaling that includes, based on a type of sidelink communications to be performed, an indication of a RB set configuration from a set of available RB set configurations, the set of available RB set configurations including at least a minimum overlapping frequency RB set configuration and performing the sidelink communications with a transmitting sidelink UE according to the RB set configuration.

An apparatus for wireless communication at a UE is described. The apparatus may include a processor, memory coupled with the processor, and instructions stored in the memory. The instructions may be executable by the processor to cause the apparatus to receive signaling that includes, based on a type of sidelink communications to be performed, an indication of a RB set configuration from a set of available RB set configurations, the set of available RB set configurations including at least a minimum overlapping frequency RB set configuration and perform the sidelink communications with a transmitting sidelink UE according to the RB set configuration.

Another apparatus for wireless communication at a UE is described. The apparatus may include means for receiving signaling that includes, based on a type of sidelink communications to be performed, an indication of a RB set configuration from a set of available RB set configurations, the set of available RB set configurations including at least a minimum overlapping frequency RB set configuration and means for performing the sidelink communications with a transmitting sidelink UE according to the RB set configuration.

A non-transitory computer-readable medium storing code for wireless communication at a UE is described. The code may include instructions executable by a processor to receive signaling that includes, based on a type of sidelink communications to be performed, an indication of a RB set configuration from a set of available RB set configurations, the set of available RB set configurations including at least a minimum overlapping frequency RB set configuration and perform the sidelink communications with a transmitting sidelink UE according to the RB set configuration.

Some examples of the method, apparatuses, and non-transitory computer-readable medium described herein may further include operations, features, means, or instructions for determining, based on the indication, a set of RBs in the RB set configuration having frequencies that overlap within each the RB set configuration in the available RB set configurations.

Some examples of the method, apparatuses, and non-transitory computer-readable medium described herein may further include operations, features, means, or instructions for performing the sidelink communications includes receiving a SCI message, a multicast message, a groupcast message, a RRC message, or any combination thereof, using the set of RBs.

In some examples of the method, apparatuses, and non-transitory computer-readable medium described herein, a PSCCH may be configured for transmissions within the set of RBs based on the set of RBs having the frequencies that overlap within a subband.

In some examples of the method, apparatuses, and non-transitory computer-readable medium described herein, a portion of a PSSCH may be configured for transmissions of a SCI message within the set of RBs based on the set of RBs having the frequencies that overlap within a subband.

In some examples of the method, apparatuses, and non-transitory computer-readable medium described herein, rate matching, for a SCI two message, frequency resources around interlaces across one or more RB sets indicated in a SCI one message.

In some examples of the method, apparatuses, and non-transitory computer-readable medium described herein, rate matching frequency resources around the set of RBs to receive a SCI two message, where the frequency resources may be used to receive a SCI one message.

In some examples of the method, apparatuses, and non-transitory computer-readable medium described herein, rate matching frequency resources around the sets of RBs to receive a PSSCH.

In some examples of the method, apparatuses, and non-transitory computer-readable medium described herein, rate matching frequency resources around expanded RB sets after the received signal indicates the RB set configuration may have overlapping frequencies.

Some examples of the method, apparatuses, and non-transitory computer-readable medium described herein may further include operations, features, means, or instructions for identifying a set of RBs of the transmitting sidelink UE available for transmitting a broadcast transmission, a groupcast transmission, or both, where the type of sidelink communications include the broadcast transmission, the groupcast transmission, or both and performing the sidelink communications using the set of RBs of the transmitting sidelink UE for the RB set configuration based on the type of sidelink communications, where the set of RBs may be associated with a transmitter-centric RB set configuration of the available RB set configurations.

In some examples of the method, apparatuses, and non-transitory computer-readable medium described herein, the set of RBs of the transmitting sidelink UE may be based on an active bandwidth part of the transmitting sidelink UE.

In some examples of the method, apparatuses, and non-transitory computer-readable medium described herein, obtaining the indication may include operations, features, means, or instructions for receiving a SCI message indicating an identifier associated with the transmitting sidelink UE and identifying the RB set configuration based on the identifier.

Some examples of the method, apparatuses, and non-transitory computer-readable medium described herein may further include operations, features, means, or instructions for determining that the RB set spans frequency resources outside of a configured RB set of the UE and puncturing the frequency resource outside of the configured RB set based on the determining.

Some examples of the method, apparatuses, and non-transitory computer-readable medium described herein may further include operations, features, means, or instructions for transmitting, to the transmitting sidelink UE, an indication of a requested RB set configuration, where the RB set configuration include the requested RB set configuration.

In some examples of the method, apparatuses, and non-transitory computer-readable medium described herein, the RB set configuration may be based on an active bandwidth part of the UE.

In some examples of the method, apparatuses, and non-transitory computer-readable medium described herein, the minimum overlapping frequency RB set configuration may be selected as the RB set configuration based on a RB set configuration indication status of the UE.

In some examples of the method, apparatuses, and non-transitory computer-readable medium described herein, obtaining the indication may include operations, features, means, or instructions for receiving one or more SCI messages indicating the RB set configuration.

In some examples of the method, apparatuses, and non-transitory computer-readable medium described herein, the type of sidelink communications being performed includes at least one of a unicast sidelink communication, a broadcast sidelink communication, a groupcast sidelink communication, a multicast sidelink communication, or a combination thereof.

In some examples of the method, apparatuses, and non-transitory computer-readable medium described herein, obtaining the indication may include operations, features, means, or instructions for receiving a SCI one message indicating a frequency domain resource allocation and identifying the RB set configuration based on the frequency domain resource allocation.

DETAILED DESCRIPTION

Figure 1:
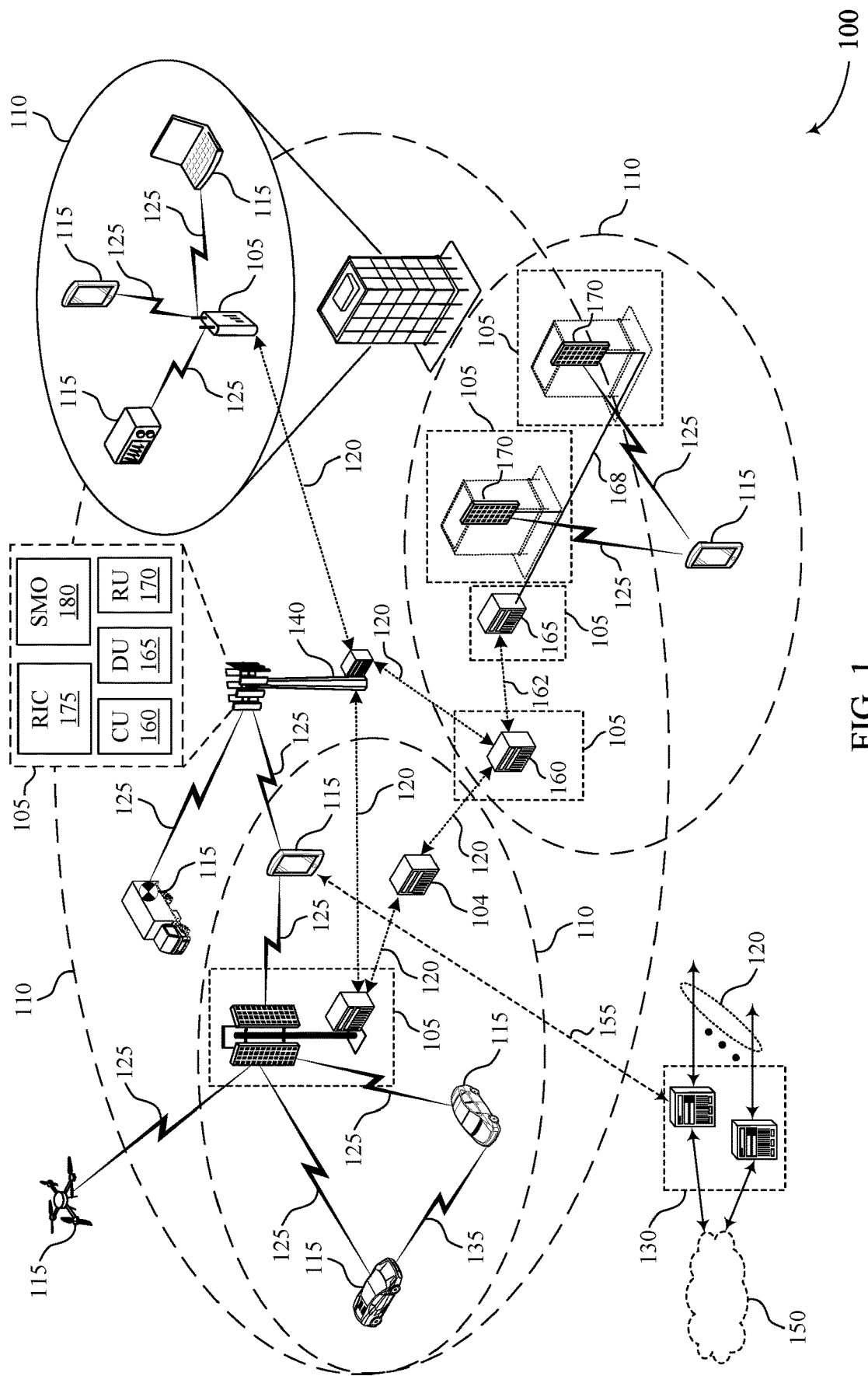
FIG. 1 illustrates an example of a wireless communications system that supports transmit or receive centric frequency domain resource allocation (FDRA) in accordance with one or more aspects of the present disclosure.

A user equipment (UE) may communicate with one or more other UEs in accordance with various sidelink communications techniques. One or more components of a network entity may send signaling that configures the UE to communicate in accordance with a sidelink communication Mode 1 or a sidelink communication Mode 2 where one sidelink UE configures the sidelink communications. In examples of the sidelink communication Mode 2, one sidelink UE may autonomously schedule sidelink communication resources with the other sidelink UE (for example, without receiving scheduling information from the network entity). In this Mode 2 situation, the scheduling sidelink UE (e.g., a transmitting sidelink UE (Tx UE)) may be communicating with other sidelink UE having different settings, capabilities, etc. Different sidelink UE may use different subbands for communications, such as different UE may use different subset(s) of subband(s) (which may be partially overlapping in the frequency domain in some examples), different resource block (RB) set guard band settings, and the like.

Sidelink nodes (e.g., UEs) with different RB set configurations may become an issue for the scheduling sidelink UE because the frequency domain resource allocation (FDRA) configuration/interpretation may be based on the RB set configuration. Moreover, such differences in RB set configurations may result in difficulties in communicating sidelink control information-one (SCI-1) and/or SCI-2 message(s) between sidelink devices having different RB set configurations. Different types of sidelink communications may benefit from some RB set configurations over other.

The described techniques relate to improved methods, systems, devices, and apparatuses that support transmit or receive centric FDRA. For example, the described techniques provide for various modes for RB set configurations between sidelink UE. One mode includes a minimum RB set configuration based on the minimum set of overlapping RBs among all possible RB set configurations (e.g., on a per a 20 MHz subband basis). Another mode includes a transmit-centric (Tx-centric) RB set configuration based on the Tx UE's assumptions/configurations. Another mode includes a receiver-centric (Rx-centric) RB set configuration based on the receiving sidelink UE's (Rx UE) assumptions/configurations. Accordingly, the Tx UE may transmit or otherwise provide an indication (e.g., implicit or explicit) of the RB set configuration to one or more Rx UEs. The RB set configuration may be selected based on the type of sidelink communications to be performed and may be from the available RB set configurations (e.g., from the minimum RB set configuration, the Tx-centric RB set configuration, or the Rx-centric RB set configuration). The sidelink UE may perform the sidelink communications according to the indicated RB set configuration.

Aspects of the disclosure are initially described in the context of wireless communications systems. Aspects of the disclosure are further illustrated by and described with reference to apparatus diagrams, system diagrams, and flowcharts that relate to transmit or receive centric frequency domain resource allocation.

FIG. 1 illustrates an example of a wireless communications system 100 that supports transmit or receive centric frequency domain resource allocation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transmit or receive centric frequency domain resource allocation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 (e.g., a transmitting sidelink UE) may transmit signaling that includes an indication of a RB set configuration to one or more sidelink UE, the RB set configuration based at least in part on a type of sidelink communications to be performed and from a set of available RB set configurations that comprises at least a minimum overlapping frequency RB set configuration. The UE 115 may perform the sidelink communications with the one or more sidelink UE according to the RB set configuration.

A UE 115 (e.g., a receiving sidelink UE) may receive signaling that includes, based at least in part on a type of sidelink communications to be performed, an indication of a RB set configuration from a set of available RB set configurations, the set of available RB set configurations comprising at least a minimum overlapping frequency RB set configuration. The UE 115 may perform the sidelink communications with a transmitting sidelink UE according to the RB set configuration.

Figure 2:
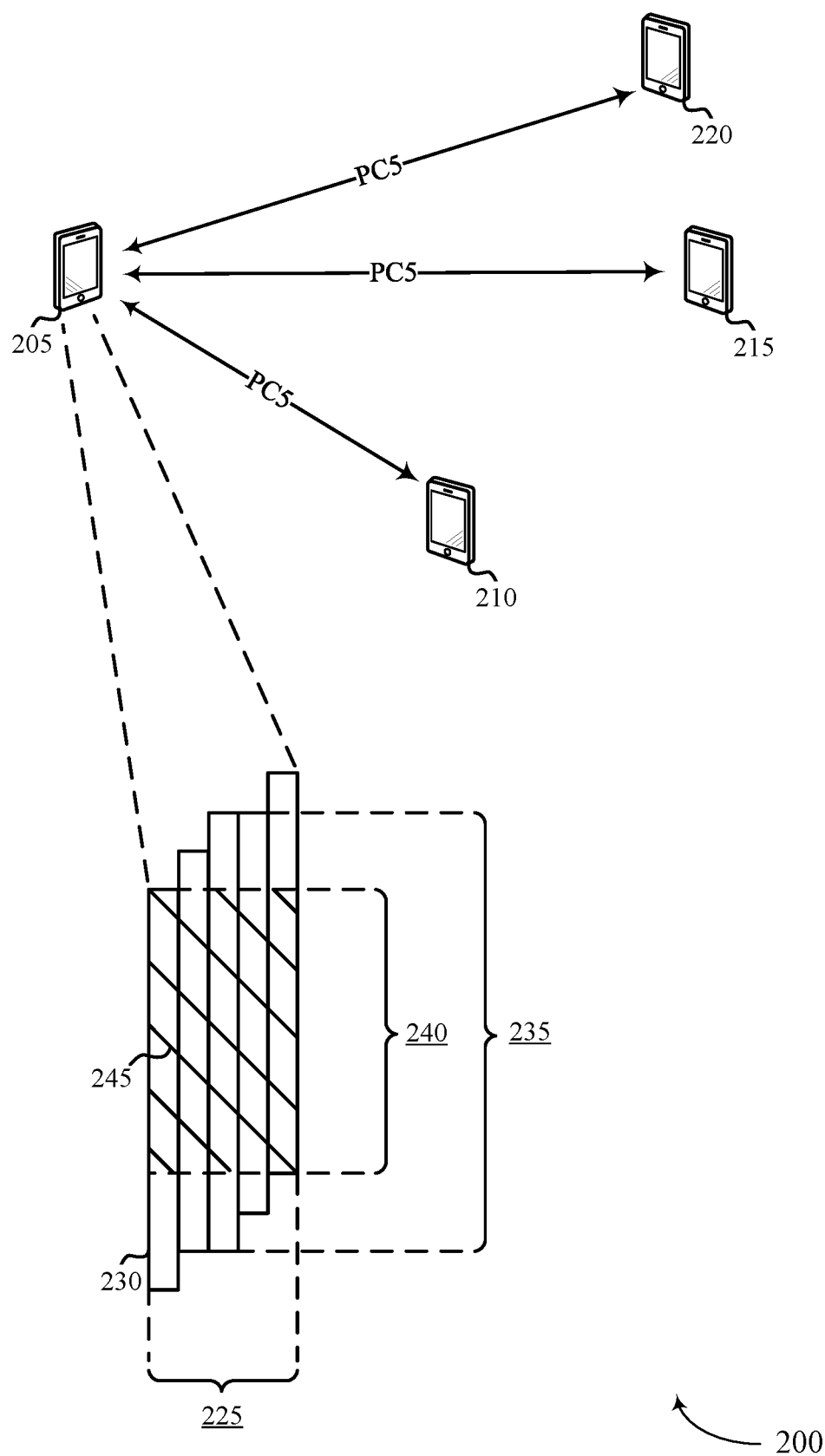
FIG. 2 illustrates an example of a wireless communication system that supports transmit or receive centric FDRA in accordance with one or more aspects of the present disclosure.

FIG. 2 illustrates an example of a wireless communication system 200 that supports transmit or receive centric FDRA in accordance with one or more aspects of the present disclosure. Wireless communication system 200 may implement aspects of wireless communication system 100. Wireless communication system 200 may include UE 205, UE 210, UE 215, and UE 220, which may be examples of the corresponding devices described herein.

In some aspects, wireless communication system 200 may perform aspects of sidelink communications over a PC5 sidelink interface. Broadly, UE 205 may be considered a transmitting sidelink UE (e.g., Tx UE) performing sidelink communications with one or more receiving sidelink UE (e.g., Rx UE), such as UE 210, UE 215, and/or UE 220, via the PC5 interface. In some aspects, wireless communication system 200 may be operating in a Mode 2 sidelink use case where UE 205 is managing aspects of the sidelink communications via the PC5 interface.

Conventional wireless communications between a network entity and UE (e.g., between a gNB/base station and a UE over a Uu cellular interface) include the network entity making decisions regarding parameter configurations, such as RB set configurations. For example, the network entity may identify or otherwise determine the UE capability (e.g., via UE capability message signaling, UE assistance information message signaling, and the like) and schedule resources (such as the RB set configuration) for the UE based on the UE capability, among other considerations.

However, sidelink communications via the PC5 interface may include the Tx UE and the Rx UE being more equal regarding such allocation and scheduling decisions. That is, sidelink communications may not include a node with a natural role such as the gNB making allocation and scheduling decisions via the Uu interface, with some exceptions such as the anchor-client scenario. Moreover, UE participating in sidelink communications may not necessarily be the same regarding capabilities, supported configurations, etc. For example, different UE may use different subsets of subbands, which may be partially overlapping in some scenarios (e.g., UE0 uses subbands 0/1 while UE1 uses subbands 1/2). Another example includes the RB set guard band settings. For example and depending on filter implementations, some UE may be able to use a smaller guard band when compared to other UE.

Such issues may become an issue in some scenarios. For example, for distributed sidelink nodes (e.g., UEs) with different RB set configurations, this may become an issue since the FDRA interpretation by the Rx UE may depend on the RB set configuration of that UE. This may result in the Tx UE and the Rx UE having different interpretations of the FDRA configuration/indication, which may result in decoding failure of the sidelink communications (e.g., PSSCH and/or PSCCH decoding failures). For example, the Rx UE may not be aware of how the Tx UE performs PSSCH transmissions in the edge RBs. Moreover, this may create confusion regarding where (e.g., using which RB(s)) the Tx UE transmits SCI-1 and/or SCI-2 message(s) so that the Rx UE(s) having different RB set configurations is/are able to successfully receive and decode those messages. Additionally, to make use of the edge RBs (e.g., to improve resource usage/efficiency), how do the Tx and/or Rx sidelink UEs choose a common RB set configurations.

Furthermore, sidelink communications may include different types of sidelink communications, such as unicast, groupcast, broadcast, SCI-1 messages, SCI-2 messages, and the like. Based on the different types of sidelink communications to be performed (e.g., unicast vs groupcast), there may be different considerations regarding how the Tx and Rx UEs reach an agreement/understanding on the RB set configuration.

Accordingly, aspects of the techniques described herein provide various mechanisms to support RB set configuration between a Tx UE (e.g., UE 205 in this example) and one or more Rx UEs (e.g., UE 210, UE 215, and/or UE 220 in this example) performing sidelink communications via the PC5 interface. Broadly, three modes of RB set configurations are described, although aspects of one or more of the three modes may be combined in some situations. For ease of reference, the three modes of RB set configurations may include a minimum RB set configuration, a Tx-centric RB set configuration, and a Rx-centric RB set configuration.

The minimum RB set configuration may be based on the minimum set of RB(s) among all possible/available RB set configurations (e.g., on a per-20 MHz subband basis) such that the Tx UE and the Rx UE have a common understanding of the FDRA indication (e.g., which RB(s) are usable) within each 20 MHz subband. This may be applied prior to remaining minimum system information (RMSI), system information block (SIB), and/or RRC configuration signaling are exchanged configuring the RB set configurations. This may generally provide common ground for SCI-1/2 rate matching (e.g., such that SCI-1/2 decoding may not depend on the configured RB set configuration signaling). This may be compared to the Tx-centric and Rx-centric RB set configuration examples which depend, at least to some degree, on the RMSI/SIB or RRC message exchange.

The Tx-centric RB set configuration may generally define the RB set guard bands based on the Tx UE's perspective. The Tx-centric RB set configuration may be used for broadcast and/or groupcast types of sidelink communications where the Tx UE transmits based on its own RB set configuration (e.g., its own set of available RB set configurations) and the Rx UE decodes the sidelink communications (e.g., PSSCH) based on the Tx UE's RB set configuration. Aspects of the Tx-Centric RB set configuration may be based on RMSI/SIB or RRC message exchanges to indicate the Tx-centric RB set configuration to the Rx UE.

The Rx-centric RB set configuration may generally define the RB set guard bands based on the Rx UE's set of available RB set configurations. For example, the Rx-centric RB set configuration may be used for unicast type sidelink communications. The Rx-centric RB set configuration may include the Tx UE applying different RB set configurations for different target Rx UE (e.g., as the RB set configuration may be defined by each Rx UE). For example, aspects of the Rx-centric RB set configuration may be based on an RRC message exchange where the Rx UE indicates its requested/supported/configured RB set configuration(s) to the Tx UE.

Aspects of the techniques described herein also provide mechanisms to support the situation where the RB sets being used by the Tx UE are different than the Rx UE, RB set configuration switching by the Tx UE based on the initial setup and cast type (e.g., type of sidelink communications) being performed, and the like.

For example, UE 205 (e.g., the Tx UE in this example) may be configured with a set of available RB set configurations 225. The set of available RB set configurations 225 may include one or more RB set configurations 230 (with each RB set configuration including one or more RB sets and each RB in the RB sets spanning 12 subcarriers/tones in the frequency domain) that may be used/configured by UE 205. UE 205 may identify, determine, or otherwise select a RB set configuration 235 from the set of available RB set configurations 225 according to the techniques discussed herein, which may be based on the type of sidelink communications being performed. In some aspects, the set of available RB set configurations may include at least a minimum overlapping frequency RB set configuration (e.g., the minimum RB set configuration, illustrated as RB set configuration 240). That is, UE 205 may configure the RB set configuration 235 for the Rx UE, which may include the RB set configuration 240.

For example, UE 205 may identify, determine, or otherwise select, a RB set configuration 235 based on the type of sidelink communications being performed (e.g., based on whether the sidelink communications include PSCCH communications and/or PSSCH communications, include unicast, groupcast, or broadcast sidelink communications, and the like). This may include UE 205 identifying or otherwise determining which RB(s) within each RB set configuration 230 are overlapping. For example, RB set configuration 240 may include RB(s) that are common among each RB set configuration 230 (e.g., overlapping RBs in the frequency domain) among the set of available RB set configurations 225. For example, the RB set configuration 240 may include RB(s) that are common to, and overlapped by, each RB set configuration 230, as illustrated by hatched area 245.

UE 205 may transmit, provide, or otherwise convey signaling that includes an indication of the RB set configuration 235 to one or more sidelink UE (e.g., Rx UE, such as UE 210, UE 215, and/or UE 220). UE 205 may perform the sidelink communications with the Rx UE according to the indicated RB set configuration.

In some examples, this may include UE 205 indicating the RB set configuration 235 and/or the RB set configuration 240. For example, the RB set configuration 240 may be the minimum RB set configuration, which may be used for PSCCH/PSSCH communications, such as SCI-1 and/or SCI-2 transmissions. UE 205 may configure the RB set configuration 235 to the receiving sidelink UE to use for sidelink communications, such as sidelink data communications over PSSCH. This approach may include the SCI-1/2 communications being performed over the RB set configuration 240 (e.g., the minimum RB set configuration) to support the Rx UE successfully being able to receive and decode the SCI-1/2 communications. The subsequent sidelink communications may be performed using the RB set configuration 240 or may use the RB set configuration 235.

Figure 3:
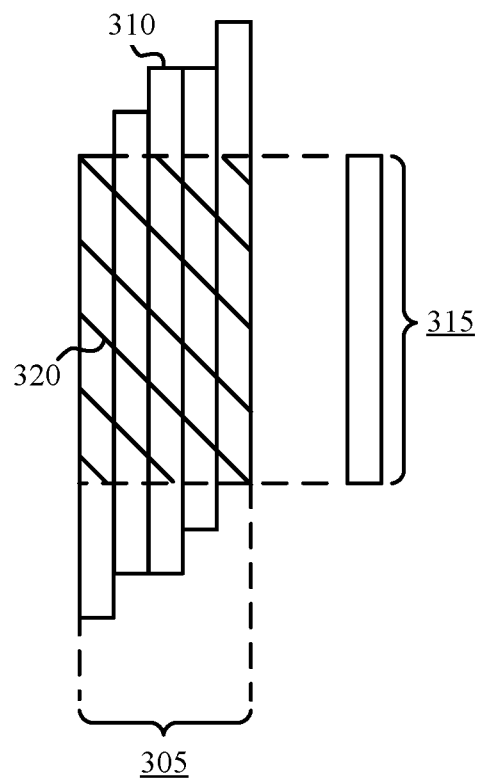
FIG. 3 illustrates an example of a RB set configuration that supports transmit or receive centric FDRA in accordance with one or more aspects of the present disclosure.

FIG. 3 illustrates an example of a RB set configuration 300 that supports transmit or receive centric FDRA in accordance with one or more aspects of the present disclosure. RB set configuration 300 may be implement aspects of wireless communication systems 100 and/or 200. Aspects of RB set configuration 300 may be implemented at or implemented by UE performing sidelink communications, which may be an example of the corresponding device described herein.

As discussed herein, aspects of the techniques described herein support a Tx UE transmitting, providing, or otherwise conveying signaling that includes an indication of a RB set configuration to one or more sidelink UE (e.g., Rx UE). The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available RB set configurations 305, which may include a plurality of RB set configurations 310 (with five RB set configurations 310 being shown by way of example only). Each RB set configuration 310 may include one or more RB sets, with each RB set including one or more RBs, and each RB spanning 12 subcarriers/tones in the frequency domain. Only one RB set configuration 310 is labeled for ease of reference. The set of available RB set configurations 305 may include at least a minimum overlapping frequency RB set configuration (illustrated as RB set configuration 315). The RB set configuration 315 may generally include RB(s) (e.g., frequency resources, with each RB generally spanning 12 subcarriers/tones in the frequency domain and one symbol in the time domain) that are common or otherwise overlap between the RB set configurations 310 in the set of available RB set configurations 305. That is, the RB set configuration 315 may include RB(s) that are common between some or all RB set configurations 310 in the set of available RB set configurations 305, or includes RB(s) that overlap within some or all RB set configurations in the set of available RB set configurations 305. The Tx UE may transmit, provide, or otherwise convey the signaling indicating the RB set configuration 315 to one or more sidelink UE (e.g., Rx UE) and perform the sidelink communications according to the indicated RB set configuration 315. For example, the RB set configuration 315 may include RB(s) that are common to, and overlapped by, each RB set configuration 310, as illustrated by hatched area 320.

RB set configuration 300 illustrates an example of the minimum RB set configuration discussed herein. For example, the Tx UE may identify or otherwise determine the set of RBs having overlapping frequencies from the RB set configurations 310 in the set of available RB set configurations 305. The Tx UE may select, identify, or otherwise determine the set of RBs for the RB set configurations 315 within a subband, such as a 20 MHz subband. Accordingly, the RB(s) contained in RB set configuration 315 may be common among all available RB set configurations 310 in the set of available RB set configurations 305.

Generally, distributed sidelink communications may be improved using a common configuration, determination, assumption, and the like, of the RB set configuration before the RB set configuration can be configured or otherwise delivered (e.g., via RMIS/SIB or RRC message exchanges). In the situation where the available RB sets allowed within a subband have an embedded structure (e.g., there is a minimum set of RBs that is "inside" or otherwise overlaps all other sets of RBs), certain handling can be supported with this minimum RB set configuration. Accordingly, the Tx UE may define the minimum RB set configuration for a 20 MHz subband from all the possible RB set configurations. This may be defined explicitly (e.g., based on the signaling indicating the RB set configuration 315) and/or implicitly derived from all RB set configurations (e.g., using the intersection of all supported RB sets). That is, in the implicit example the signaling may refer to the configuration/indication of the available RB set configurations of the Tx UE and/or the Rx UE.

In some aspects, the minimum RB set configuration (e.g., RB set configuration 315) may be supported for certain, non-limiting use cases. One use case may include the SCI-1/2 message being confined within the minimum RB set configuration, even in the situation where the normal sidelink communications are performed with a larger RB set configuration that covers (e.g., overlaps) the minimum RB set configuration. In this use case, other nodes (e.g., Rx UE) may, without knowing the Tx UE's RB set configuration, still be able to decode the SCI message transmission. Another use case may include, for multicast/broadcast or for initial RRC message exchanges to setup (e.g., configure) an expanded Tx/Rx RB set configuration, the transmission can use the minimum RB set configuration while unicast sidelink communications after the Tx/Rx RB set configurations are RRC configured may use a larger RB set.

Accordingly, the Tx UE may signal an indication of the RB set configuration 315 to Rx UE (e.g., explicit signaling indicating RB set configuration 315 and/or implicitly using signaling indicating the set of available RB set configurations 305). The Tx UE may perform the sidelink communications with the Rx UE according to the RB set configuration 315 via a PC5 sidelink interface.

Figure 4:
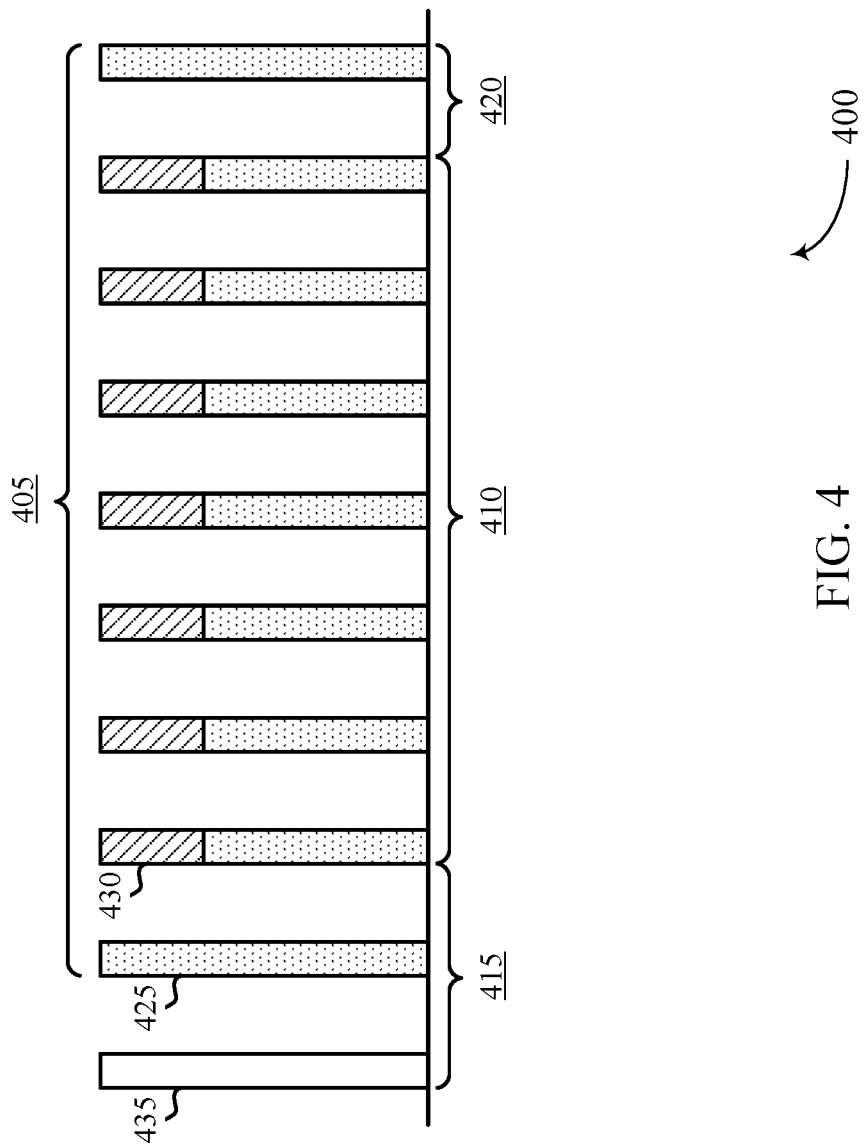
FIG. 4 illustrates an example of a RB set configuration that supports transmit or receive centric FDRA in accordance with one or more aspects of the present disclosure.

FIG. 4 illustrates an example of a RB set configuration 400 that supports transmit or receive centric FDRA in accordance with one or more aspects of the present disclosure. RB set configuration 400 may implement aspects of wireless communication systems 100 and/or 200 and/or RB set configuration 300. Aspects of RB set configuration 400 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE (e.g., Rx UE). The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration 405 from a set of available sets of RB configurations (e.g., the actually configured RB set configuration), which may include a plurality of RB set(s). The set of available RB set configurations may include at least a minimum overlapping frequency RB set configuration (illustrated as RB set configuration 410). The RB set configuration 410 may generally include RB(s) that are common or otherwise overlap between the RB set configurations in the set of available RB set configurations. The Tx UE may transmit, provide, or otherwise convey the signaling indicating the RB set configuration 405 to one or more sidelink UE (e.g., Rx UE) and perform the sidelink communications according to RB set configuration 405 and/or RB set configuration 410.

RB set configuration 400 illustrates another example of aspects of the minimum RB set configuration discussed herein. For example, the Tx UE may identify or otherwise determine the set of RBs having overlapping frequencies from the RB set configurations in the set of available set of RB configurations. The Tx UE may select, identify, or otherwise determine the set of RBs for the RB set configurations within a subband, such as a 20 MHz subband.

Generally, PSCCH may be carried on a subset of the RB(s)/symbol(s) of the subchannel (e.g., first two or three symbols and first X RBs in a subchannel per the RB set configuration). However, without knowledge of the RB set configuration, a Rx UE may not be able to identify the location of PSCCH.

Accordingly, aspects of the techniques described herein provide for the PSCCH location within a subchannel being confined within the minimum RB set configuration (e.g., RB set configuration 410) within the subband (e.g., a 20 MHz subband). That is, the Tx UE may configure the PSCCH for transmissions within the set of RBs based on the set of RBs having the overlapping frequencies (e.g., frequencies that overlap) within the subband.

For example, the PSCCH resource mapping may be confined within a subchannel and the minimum RB set in the 20 MHz subband. The PSCCH may use different minimum RB sets (e.g., different 20 MHz subbands). Within a given subband, the PSCCH may take/use different subchannels/interlaces. The PSCCH decoding may be supported even if the Rx UE did not receive the S-SSB or the RRC configuration that defines the actual RB set configuration. That is, the location of PSCCH may be fixed regardless of the RB set configuration.

That is, the Tx UE may signal an indication of RB set configuration 405 to the Rx UE. The RB set configuration may include a plurality of RBs 425, with nine RBs 425 being shown by way of example only. The RB set configuration 405 may be associated with a configured RB set guard band #x−1 (e.g., illustrated as RB set 415), a minimum RB set (illustrated as RB set configuration 410), and a configured RB set guard band #x (illustrated as RB set 420). RB 435 may generally be an unused RB that is contained in the interlace of RB set configuration 405. In this example, PSCCH 430 is configured for transmission within the minimum set of RBs (e.g., RB set configuration 410) based on the set of RBs having the overlapping frequencies within the subband. Accordingly, in this example the PSCCH (e.g., SCI messages) may be transmitted in the RB set configuration 410 (e.g., the minimum overlapping RBs within the set of available RB set configurations) in the situation where the Rx UE is configured with RB set configuration 405. In some aspects, the Rx UE may rate match the PSSCH around the PSCCH 430 carried in the minimum RB set (e.g., RB set configuration 410).

Figure 5:
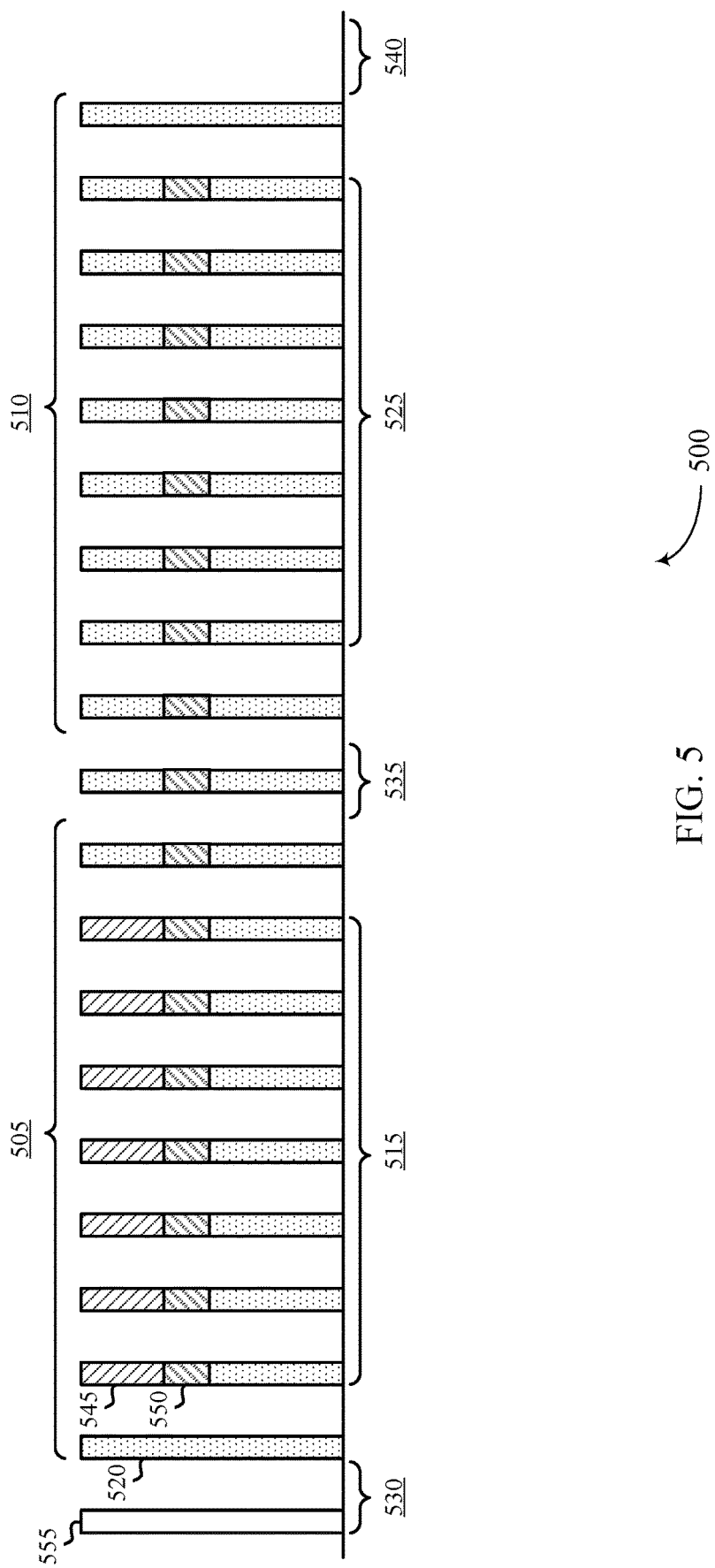
FIG. 5 illustrates an example of a RB set configuration that supports transmit or receive centric FDRA in accordance with one or more aspects of the present disclosure.

FIG. 5 illustrates an example of a RB set configuration 500 that supports transmit or receive centric FDRA in accordance with one or more aspects of the present disclosure. RB set configuration 500 may implement aspects of wireless communication systems 100 and/or 200 and/or RB set configurations 300 and/or 400. Aspects of RB set configuration 500 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE. The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available RB configurations, which may include a plurality of RB set configurations. The set of available RB set configurations may include at least a minimum overlapping frequency RB set configuration. The minimum RB set configuration may generally include RB(s) that are common or otherwise overlap between the RB set configurations in the set of available RB set configurations. The Tx UE may transmit, provide, or otherwise convey the signaling indicating the RB set configuration to one or more sidelink UE (e.g., Rx UE) and perform the sidelink communications according to the indicated RB set configuration.

RB set configuration 500 illustrates another example of aspects of the minimum RB set configuration discussed herein. For example, the Tx UE may identify or otherwise determine the set of RBs having overlapping frequencies from the RB set configurations in the set of available set of RB configurations. The Tx UE may select, identify, or otherwise determine the set of RBs for the RB set configuration within a subband, such as a 20 MHz subband.

Generally, when the RB set configuration may be a Tx-centric RB set configuration, the Rx UE may need to identify or otherwise determine the identifier (ID) of the Tx UE in order to adjust the RB set configuration for reception. The ID of the Tx UE may generally be carried or otherwise indicated in the SCI-2 message. Also, the Tx UE may determine to provide an indication in the SCI-2 to the Rx UE to use different RB set configuration assumptions when decoding (e.g., the Tx/Rx centric RB set configuration or the minimum RB set configuration) the sidelink communications.

RB set configuration 500 illustrates an example where SCI-2 resource elements carrying PSSCH 550 are confined within the minimum RB set(s) that contain the scheduling SCI-1 (e.g., carried in PSCCH 545). For example, the Tx UE may indicate a first configured RB set (e.g., RB set configuration 505) and a second configured RB set (e.g., RB set configuration 510). Each RB set configuration may include a plurality of RBs 520, with nine RBs 520 being shown by way of example only. RB 555 may be an unused RB in the interlace. As discussed with respect to RB set configuration 400, the PSCCH 545 (e.g., carrying SCI-1) may be transmitted in the minimum RB set configuration 515 of the RB set configuration 505. The RB set configuration 515 may be between a RB set 530 including a configured RB set guard band #x−1 and RB set 535 (e.g., a configured RB set guard band #x). The RB set configuration 510 may also include a minimum RB set configuration (e.g., RB set configuration 525) that is between the RB set 535 and RB set 540 (e.g., a configured RB set guard band #x+1). Accordingly, in this example the Tx UE may configure at least a portion of a PSSCH 550 for transmissions of a SCI message (e.g., SCI-2 message) within the set of RBs based on the overlap (e.g., based on the minimum RB set configuration used to carry PSCCH 545).

The Rx UE may perform rate matching according to various aspects of the described techniques. That is, SCI-2 resource elements may be rate matched to the resource elements within the minimum RB set (e.g., RB set configuration 515 and/or RB set configuration 525) and around the first PSSCH demodulation reference signal (DMRS). If the SCI-1 FDRA indication schedules PSSCH transmission across multiple 20 MHz subbands, there may be multiple resource mapping options.

One option may include the Rx UE rate matching, for a SCI-2 message, frequency resources around interlaces across multiple RBs (e.g., one or more RB set(s)) indicated in a SCI-1 message. For example, the SCI-2 may be rate matched to the frequency resources in the scheduled interlace RBs which are contained in the minimum RB sets of the scheduled subbands and/or the gaps in between the scheduled minimum RB sets (e.g., RB set 535). The FDRA indicated in SCI-1 may already indicate the scheduled 20 MHz subbands. This may differ from other techniques where the SCI-2 is rate matched to all the scheduled subchannels.

Another option may include the Rx UE rate matching frequency resources around the set of RBs to receive a PSSCH message. That is and for the data resource elements in PSSCH (e.g., rather than the SCI-2 resource elements), the Rx UE may use the full configured RB sets as the SCI messages which may indicate which RB set configuration to apply. In this option, based on whether RRC/RMIS/SIB configured RB set configurations are known to the Tx UE and/or Rx UE or not, the PSSCH may be rate matched based on the configured RB sets or the minimum RB sets. For the RMIS/SIB transmissions and/or the RRC message exchanges, the expanded or actual RB set configurations may not be known. The PSSCH resource elements may be rate matched to the allocated interlace in the allocated minimum RB sets and into the RBs in the allocated interlace, but between the adjacent allocated minimum RB sets. With the RRC/RMSFSIB configured RB sets, the PSSCH may be rate matched to the edge RBs inside the configured RB set but outside the minimum RB set. The data resource elements in PSSCH may be rate matched around the PSCCH and the SCI-2 resource elements in the minimal RB set.

Figure 6:
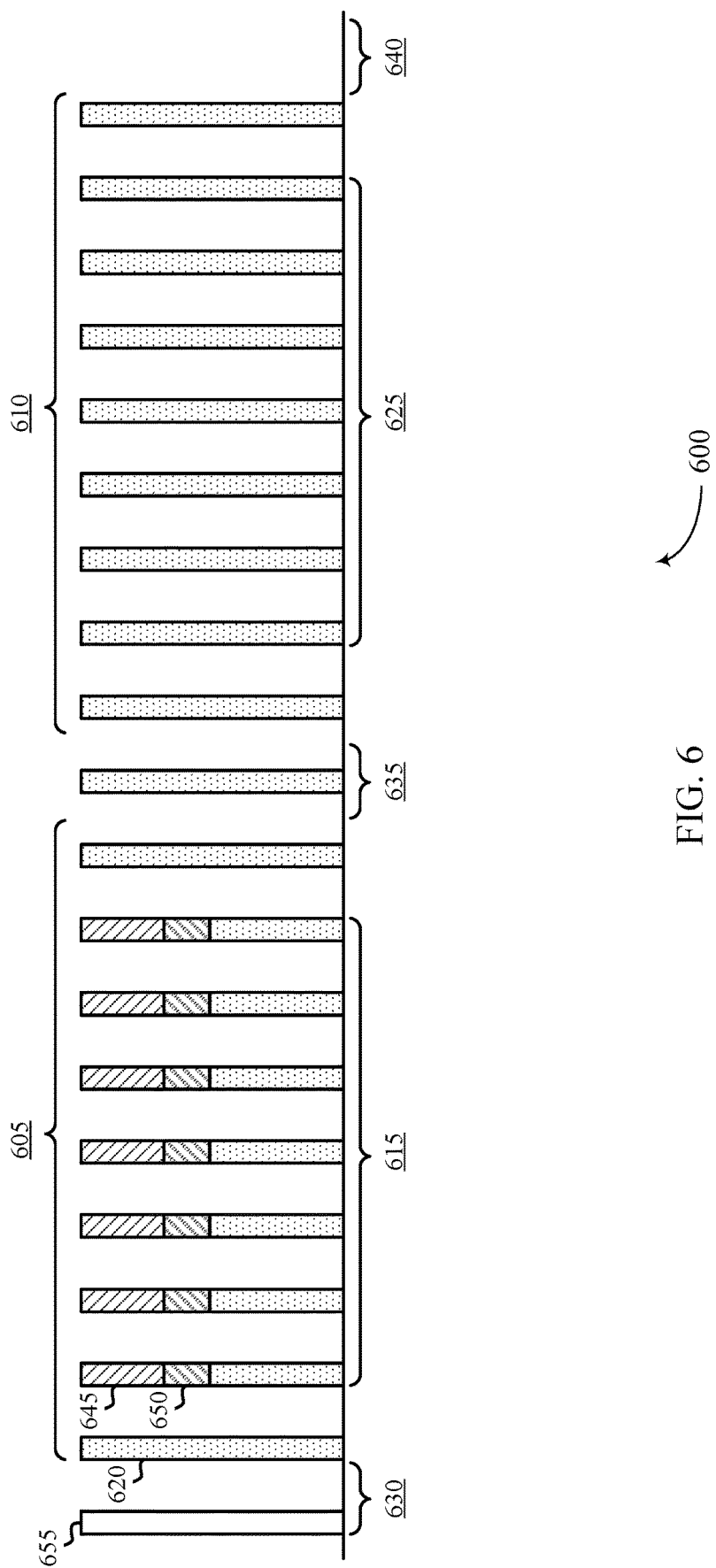
FIG. 6 illustrates an example of a RB set configuration that supports transmit or receive centric FDRA in accordance with one or more aspects of the present disclosure.

FIG. 6 illustrates an example of a RB set configuration 600 that supports transmit or receive centric FDRA in accordance with one or more aspects of the present disclosure. RB set configuration 600 may implement aspects of wireless communication systems 100 and/or 200 and/or RB set configurations 300, 400, and/or 500. Aspects of RB set configuration 600 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE. The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available sets of RB configurations, which may include a plurality of RB set configurations. The set of available RB set configurations may include at least a minimum overlapping frequency RB set configuration. The minimum RB set configuration may generally include RB(s) that are common or otherwise overlap between the RB set configurations in the set of available RB set configurations. The Tx UE may transmit, provide, or otherwise convey the signaling indicating the RB set configuration to one or more sidelink UE (e.g., Rx UE) and perform the sidelink communications according to RB set configuration.

RB set configuration 600 illustrates another example of aspects of the minimum RB set configuration discussed herein. For example, the Tx UE may identify or otherwise determine the set of RBs having overlapping frequencies from the RB set configurations in the set of available RB set configurations. The Tx UE may select, identify, or otherwise determine the set of RBs for the RB set configurations within a subband, such as a 20 MHz subband.

RB set configuration 600 illustrates an example where SCI-2 resource elements carrying PSSCH 650 are confined within the minimum RB set(s) that contain the scheduling SCI-1 (e.g., carried in PSCCH 645). For example, the Tx UE may indicate a first configured RB set (e.g., RB set configuration 605) and a second configured RB set (e.g., RB set configuration 610). Each RB set configuration may include a plurality of RBs 620, with nine RBs 620 being shown by way of example only. RB 655 may be an unused RB in the interlace. As discussed with respect to RB set configuration 400, the PSCCH 645 (e.g., carrying SCI-1) may be transmitted in the minimum RB set configuration 615 of the RB set configuration 605. The RB set configuration 615 may be between a RB set 630 including a configured RB set guard band #x−1 and RB set 635 (e.g., a configured RB set guard band #x). The RB set configuration 610 may also include a minimum RB set configuration (e.g., RB set configuration 625) that is between the RB set 635 and RB set 640 (e.g., a configured RB set guard band #x+1). Accordingly, in this example the Tx UE may configure at least a portion of a PSSCH 650 for transmissions of a SCI message (e.g., SCI-2 message) within the set of RBs based on the overlap (e.g., based on the minimum RB set configuration used to carry PSCCH 645).

As discussed above, the Rx UE may perform rate matching according to various aspects of the described techniques. That is, SCI-2 resource elements may be rate matched to the resource elements within the minimum RB set (e.g., RB set configuration 615) and around the first PSSCH DMRS. If the SCI-1 FDRA indication schedules PSSCH transmission across multiple 20 MHz subbands, there may be multiple resource mapping options.

One option may include the Rx UE rate matching frequency resources around the set of RBs to receive a SCI-2 message, where the frequency resources (e.g., RBs) were used to receive the SCI-1 message. For example, the SCI-2 may be rate matched to the frequency resources in the scheduled interlace RBs and is contained in the minimum RB set carrying the associated SCI-2 (e.g., within one 20 MHz subband).

In some aspects, this may include the Rx UE rate matching frequency resources (e.g., RBs 620) around expanded RB sets after the received signal indicates the RB set configuration have the overlapping frequencies.

Figure 7:
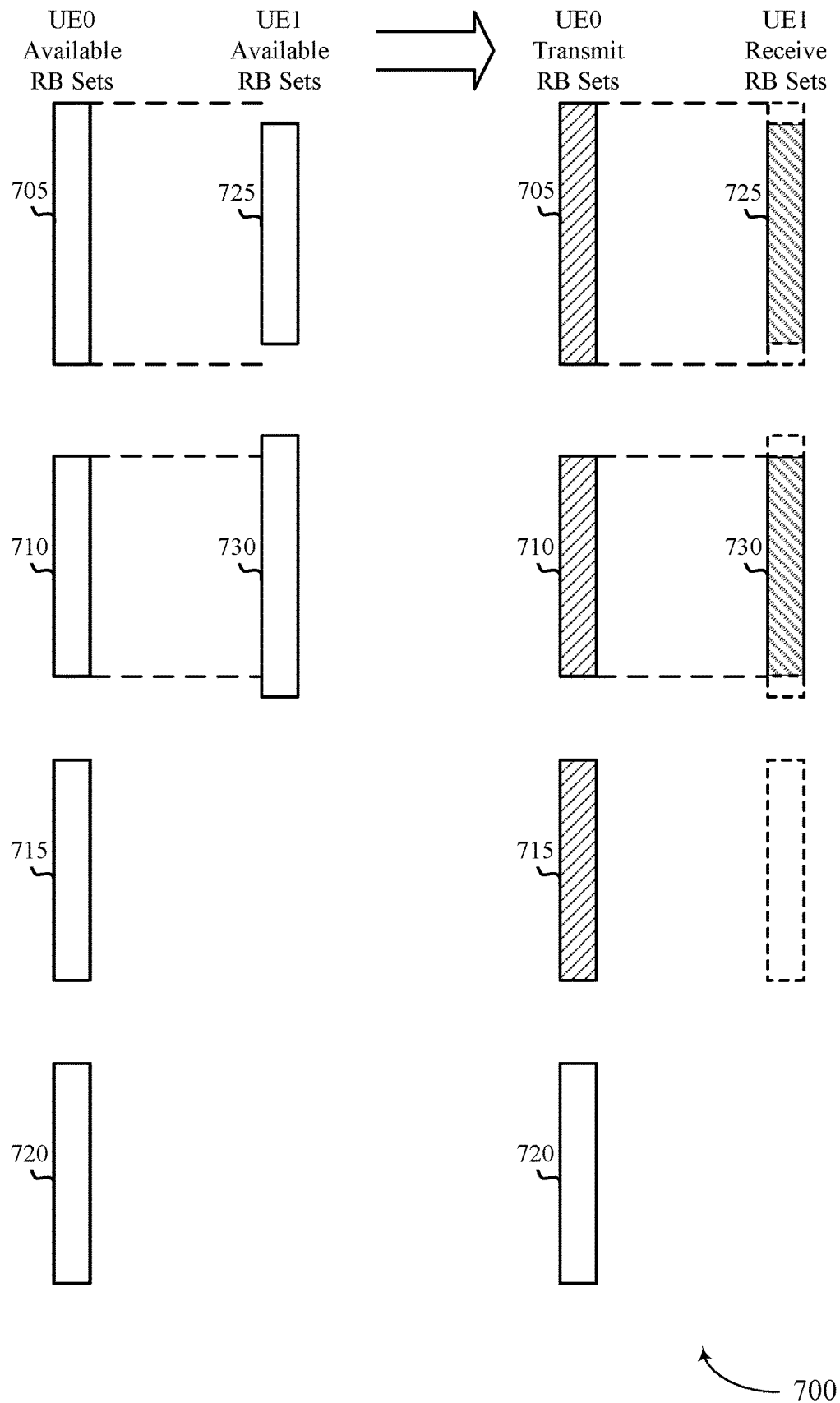
FIG. 7 illustrates an example of a RB set configuration that supports transmit or receive centric FDRA in accordance with one or more aspects of the present disclosure.

FIG. 7 illustrates an example of a RB set configuration 700 that supports transmit or receive centric FDRA in accordance with one or more aspects of the present disclosure. RB set configuration 700 may implement aspects of wireless communication systems 100 and/or 200 and/or RB set configurations 300, 400, 500, and/or 600. Aspects of RB set configuration 700 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE. The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available RB configurations, which may include a plurality of RB set configurations. The set of available RB set configurations may include at least a minimum overlapping frequency RB set configuration. The minimum RB set configuration may generally include RB(s) that are common or otherwise overlap between the RB set configurations in the set of available RB set configurations. The Tx UE may transmit, provide, or otherwise convey the signaling indicating the RB set configuration to one or more sidelink UE (e.g., Rx UE) and perform the sidelink communications according to the indicated RB set configuration.

RB set configuration 700 illustrates an example of a Tx-centric RB set configuration being configured for the sidelink communications. The Tx-centric RB set configuration may support, for broadcast and/or groupcast messages, the Tx UE using one common RB set configuration for all Rx UE. Accordingly, the Tx UE may identify, select, or otherwise determine a set of RBs of the Tx UE available for transmitting a broadcast and/or groupcast transmission. In the non-limiting illustrated in RB set configuration 700, this may include the Tx UE identifying RB set 705, RB set 710, RB set 715, and RB set 720 available for performing the groupcast and/or broadcast transmission. The Tx UE may select the set of RBs of the Tx UE for the RB set configuration based on the type of sidelink communications (e.g., the groupcast and/or broadcast sidelink communications).

The Rx UE, in this non-limiting example, may be configured with RB set 725 and RB set 730 to use for sidelink communications. The Rx UE may also identify or otherwise determine the set of RBs of the Tx UE available for the sidelink communications and perform the sidelink communications based on the identifying. In the non-limiting example illustrated in RB set configuration 700, this may include the Tx UE identifying or otherwise selecting the set of RBs (e.g., RB set 705, RB set 710, and RB set 715) to use for the sidelink communications (e.g., for the groupcast and/or broadcast transmissions to Rx UE). That is, the RB set configuration may include the RB set 705, RB set 710, and RB set 715.

In some aspects, the FDRA for the sidelink transmissions (including the RB sets used and the set of RBs for each RB set) may be transmitter dependent and (pre)configured via RMSI/SIB/RRC. For the Tx UE, there may be a single set of RB set settings and all transmissions may follow those settings. If there are multiple Tx UE with different RB set settings (e.g., with different RB set configurations) that a Rx UE is interested in receiving sidelink communications from, the Rx UE may need to apply different RB set settings while receiving the transmissions, with the applied RB set settings being transmitter dependent. In some examples, the Tx-centric RB set configuration may be included or otherwise signaled in RMSI/SIB signaling and/or (pre)configured via RRC messages with the minimum RB set configuration. In some aspects, the identified set of RBs of the Tx UE may be based on the active BWP of the Tx UE.

In some examples, the Rx UE may identify or otherwise determine the ID of the Tx UE for a transmission in order to apply the correct RB set setting (e.g., the RB set configuration). For example, the SCI-2 may carry or otherwise convey an indication of the ID of the Tx UE. Accordingly, the Rx UE may receive a SCI message (e.g., SCI-2) indicating the ID of the Tx UE and identify or otherwise determine the RB set configuration based on the 1D.

Accordingly, the SCI-2 may be rate matched around the minimum RB set to support the SCI-2 being received without the Rx UE knowing which Tx-centric RB set configuration to apply for the sidelink communications. SCI-1 may be confined to the minimum RB set configuration as well to support the Rx UE receiving the FDRA indication for SCI-2. This may impact channel estimation procedures as the channel estimation may be performed assuming the minimum RB set configuration as well as to decode SCI-2, but may be repeated if the actual RB set configuration is different (e.g., wider). The Tx UE may ensure all Rx UE can support the guard band RB set configurations in the Tx-centric RB set configuration scenario.

In some aspects where the Tx UE used RBs exceeds the set of RBs the Rx UE can receive (filtered), the Rx UE may implement puncturing for RBs outside of its reception range or the Tx UE can fall back into the minimum RB set configuration and retransmit. For a Rx UE, if the Tx UE used RBs exceeds the set of RBs the receiver can receive (filtered), the reception may still be successful, with the RBs outside the reception range being punctured by receiver implementation. For groupcast transmissions, in case one Rx UE does not support such RB set configuration and the PSCCH/PSSCH decoding fails, a NACK may be reported. The retransmission could fall back into the minimum RB set configuration.

Accordingly, as is shown in RB set configuration 700, the Tx UE (e.g., UE0 in this example) may perform the sidelink communications using RB set 705, RB set 710, and RB set 715, of which the RB set 705 and RB set 710 are inside the RB set 725 and RB set 730, respectively, of the Rx UE (e.g., UE1 in this example). That is, RB(s) in a portion of RB set 705 which are outside of UE1's receive RB set 725 may be punctured. Accordingly, the Rx UE may puncture the RB(s) (e.g., frequency resources) outside of the reception range of the Rx UE according to these techniques.

Figure 8:
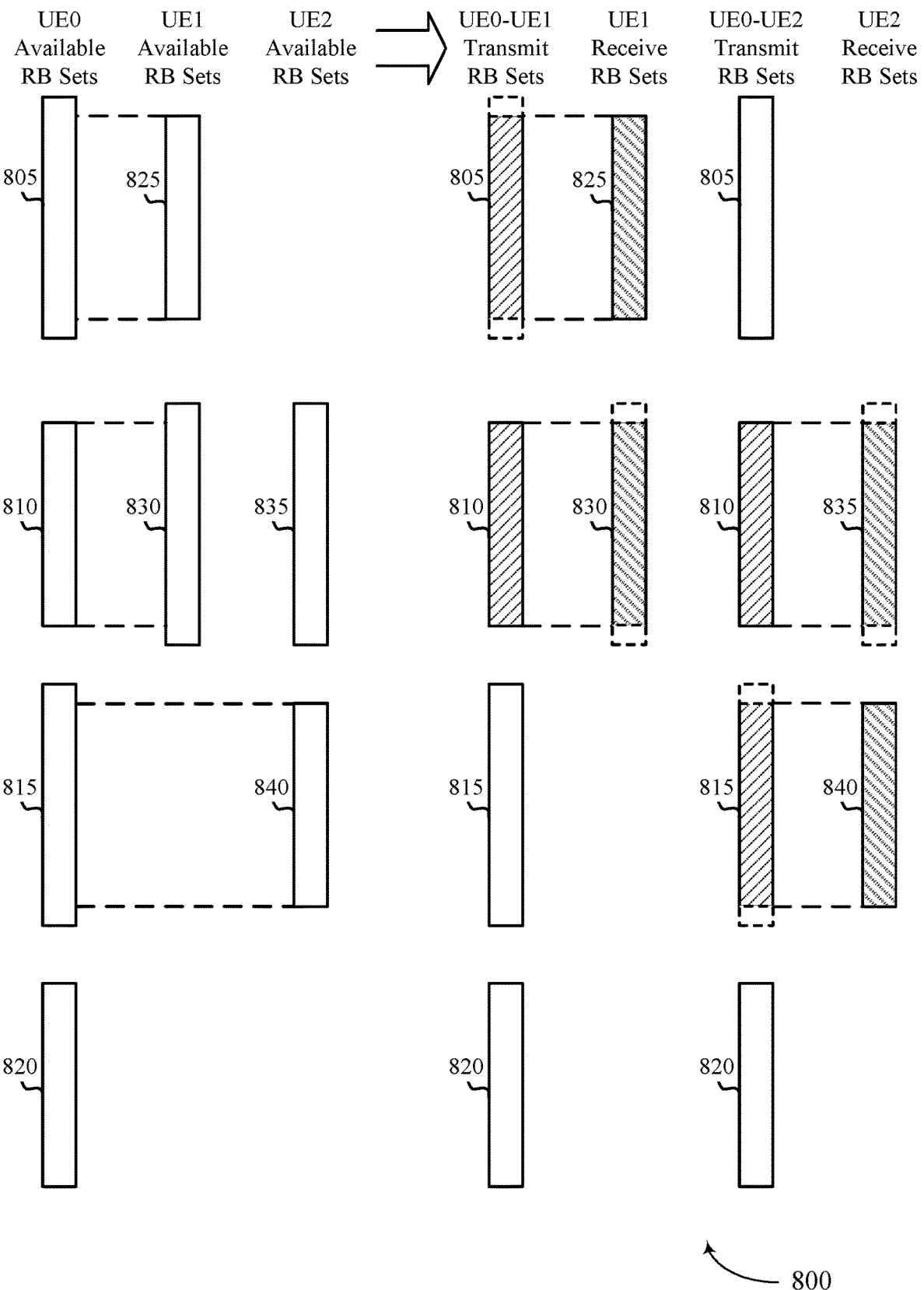
FIG. 8 illustrates an example of a RB set configuration that supports transmit or receive centric FDRA in accordance with one or more aspects of the present disclosure.

FIG. 8 illustrates an example of a RB set configuration 800 that supports transmit or receive centric FDRA in accordance with one or more aspects of the present disclosure. RB set configuration 800 may implement aspects of wireless communication systems 100 and/or 200 and/or RB set configurations 300, 400, 500, 600, and/or 700. Aspects of RB set configuration 800 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE. The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available sets of RB configurations, which may include a plurality of RB set configurations. The set of available RB set configurations may include at least a minimum overlapping frequency RB set configuration. The minimum RB set configuration may generally include RB(s) that are common or otherwise overlap between the RB set configurations in the set of available RB set configurations. The Tx UE may transmit, provide, or otherwise convey the signaling indicating the RB set configuration to one or more sidelink UE (e.g., Rx UE) and perform the sidelink communications according to the indicated RB set configuration.

RB set configuration 800 illustrates an example of a Rx-centric RB set configuration being configured for the sidelink communications. In this design, the Rx UE may transmit or otherwise provide (and the Tx UE may receive or otherwise obtain) an indication of a requested RB set configuration (e.g., for the Rx UE) and identify or otherwise select the requested RB set configuration as the RB set configuration for the Rx UE to use for sidelink communications.

For the Rx-central RB set configuration, the Tx UE may know who the intended Rx UE is for the sidelink transmissions, and therefore use the Rx UE's parameter for the FDRA indication (e.g., the FDRA indication may be based on the available RB set configurations of the Rx UE). That is, aspects of the Rx-centric RB set configuration may be based on the Tx UE identifying or otherwise knowing the Rx UE parameters (e.g., requested/available RB set configuration). To support this, the Rx UE may announce its parameters to the Tx UE and/or there may be earlier signaling exchange (e.g., UE capability message signaling) between the Tx UE and the Rx UE to determine the requested RB set configuration of the Rx UE. In some aspects, the Rx-centric RB set configuration may be used for unicast sidelink transmissions. The Rx-centric RB set configuration may be used for groupcast and/or broadcast sidelink transmissions as well. In some aspects, the Tx UE may signal the Rx-centric RB set configuration to Rx UE having a matching interpretation of the FDRA (e.g., may be aware of the Rx UE's requested/supported RB set configurations).

The FDRA interpretation is generally Rx UE dependent. In the Rx-centric RB set configuration case, the Rx UE may simply use its own RB set and guard band configuration to interpret the FDRA indicated in the SCI message(s) from the Tx UE. This may permit the Rx UE to avoid decoding the SCI-2 before interpreting the FDRA, which may avoid rate matching changes of SCI-2.

Accordingly, the Rx-centric RB set configuration may support the FDRA indicated for a sidelink transmission (including the RB sets used and the set of RBs for each RB set) being Rx UE dependent. For a unicast sidelink transmission, the Tx UE may find out (e.g., receive an indication of) the RB set configuration of the Rx UE and then transmit sidelink communications using that RB set configuration of the Rx UE. In the non-limiting example illustrated in RB set configuration 800, this may include the Tx UE (UE0 in this example) being configured with RB set configuration 805, RB set configuration 810, RB set configuration 815, and RB set configuration 820. A first Rx UE (UE1 in this example) may be configured with or otherwise support RB set configuration 825 and RB set configuration 830. A second Rx UE (UE2 in this example) may be configured with or otherwise support RB set configuration 835 and RB set configuration 840.

The Tx UE may identify or otherwise determine the RB set configurations of the Rx UE (UE1 and UE2 in this example). For example, the Tx UE may receive or otherwise obtain an indication of a requested RB set configuration from each Rx UE. This may be based on RRC signaling exchanged between the Tx UE and each Rx UE. This may be based on a minimum RB set configuration, in some examples. The Rx UE may use their requested RB set configurations to receive the sidelink transmissions from the Tx UE. For example, the first Rx UE may receive sidelink transmissions in RB set configuration 825 and in at least a portion of RB set configuration 830. The second Rx UE may receive sidelink transmissions in at least a portion of RB set configuration 835 and RB set configuration 840. That is, the RB set configuration 805 of the Tx UE includes more RBs (e.g., is wider in bandwidth in the frequency domain) than the corresponding RB set configuration 825 of the first Rx UE. Accordingly, the Tx UE may not transmit the sidelink transmission to the first Rx UE in the edge RBs to conserve resources since the first Rx UE will be unable to receive those transmissions. Or the Tx UE may perform the sidelink transmissions in the edge RBs and the Rx UE may puncture those RBs. Accordingly, each Rx UE may use its own setting (e.g., RB set configuration) to receive the sidelink transmission based on the indication of the requested RB set configuration being adopted by the Tx UE.

Figure 9:
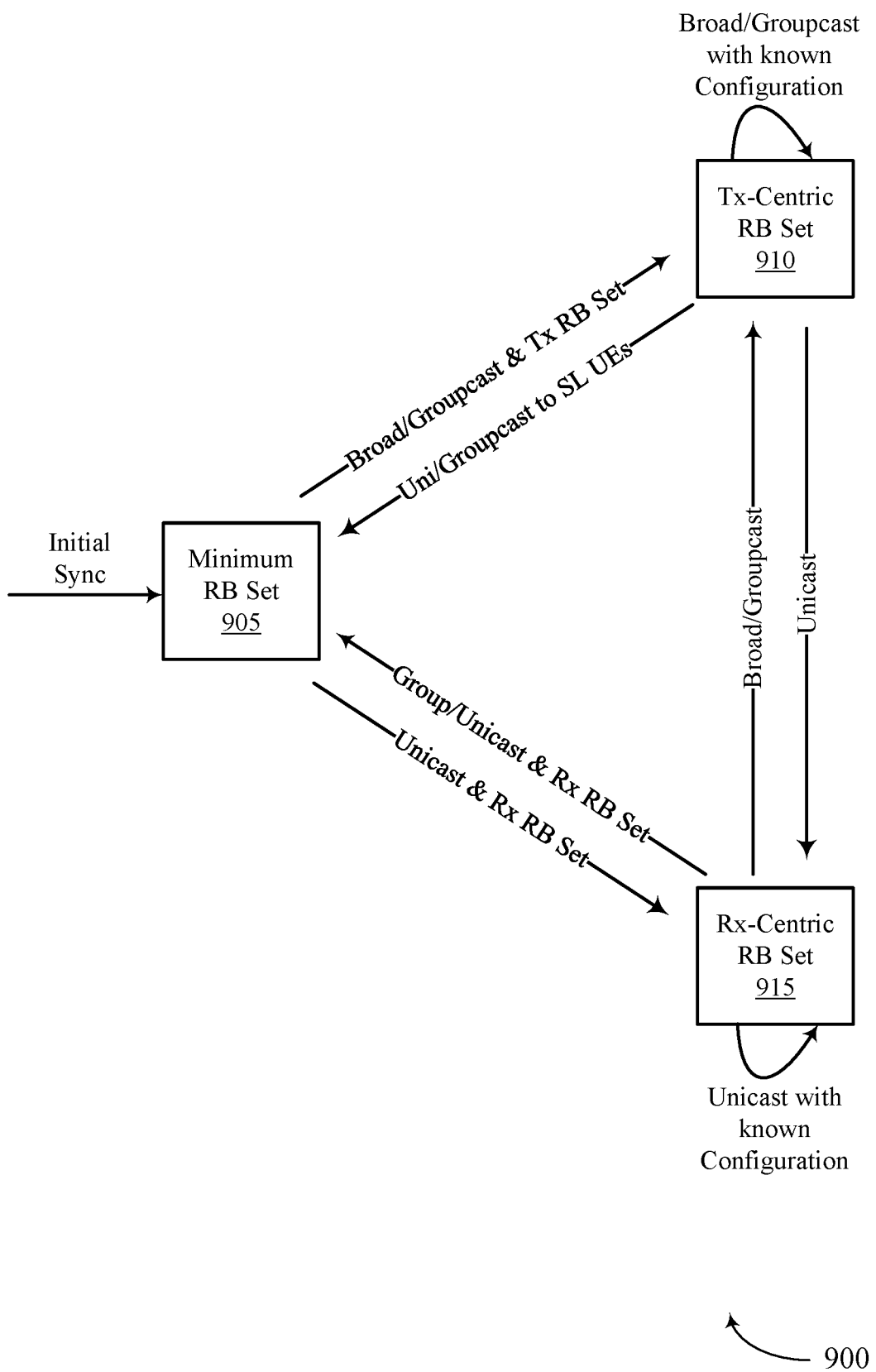
FIG. 9 illustrates an example of a RB set switching configuration that supports transmit or receive centric FDRA in accordance with one or more aspects of the present disclosure.

FIG. 9 illustrates an example of a RB set switching configuration 900 that supports transmit or receive centric FDRA in accordance with one or more aspects of the present disclosure. RB set switching configuration 900 may implement aspects of wireless communication systems 100 and/or 200 and/or RB set configurations 300, 400, 500, 600, 700, and/or 800. Aspects of RB set switching configuration 900 may be implemented at or implemented by UE performing sidelink communications, which may be an example of the corresponding devices described herein.

As discussed herein, aspects of the techniques described herein support a Tx UE transmitting, providing, or otherwise conveying signaling that includes an indication of a RB set configuration to one or more sidelink UE. The Tx UE may identify or otherwise select the RB set configuration based on the type of sidelink communications being performed. For example, the type of sidelink communications may include SCI-1/SCI-2 sidelink communications, unicast, groupcast, and/or broadcast sidelink communications, and the like.

In some aspects, the Tx UE may identify, determine, or otherwise select the RB set configuration from a set of available sets of RB configurations, which may include a plurality of RB set configurations. The set of available RB set configurations may include at least a minimum overlapping frequency RB set configuration. The minimum RB set configuration may generally include RB(s) that are common or otherwise overlap between the RB set configurations in the set of available RB set configurations. The Tx UE may transmit, provide, or otherwise convey the signaling indicating the RB set configuration to one or more sidelink UE (e.g., Rx UE) and perform the sidelink communications according to the RB set configuration.

Aspects of the techniques described herein provide mechanisms to support distinguishing the FDRA modes. That is, the three modes of RB set configurations being discussed (e.g., minimum RB set configuration, Tx-centric RB set configuration, and Rx-centric RB set configuration) may introduce an issue regarding how sidelink nodes determine which mode to apply.

One option may include the Tx UE identifying or otherwise determining a RB set configuration indication status for the Rx UE and selecting or otherwise determining the RB set configuration based on the indication status. For example, the RB set configuration mode to be applied may be based on the type of sidelink communications being performed as well as any implicit/explicit indication of the RB set configuration. As one non-limiting example, this may include the cast type indication used in SCI-2 being used to carry or otherwise convey the RB set configuration indication status (e.g., the cast type indicating the type of sidelink communications to be performed may implicitly indicate the RB set configuration).

For a unicast sidelink transmission type, the Rx-centric RB set configuration may be selected if the RB set configuration is known by both the Tx UE and the Rx UE. Otherwise, the minimum RB set configuration may be used as the RB set configuration. In some examples, one bit/field may be included in SCI-1/2 to indicate between the two modes (e.g., minimum RB set configuration or Rx-centric RB set configuration). For broadcast or groupcast sidelink transmission types, the Tx-centric RB set configuration may be used if the RB set configuration is known by both the Tx UE and the Rx UE. Otherwise, the minimum RB set configuration may be used as the RB set configuration. In some aspects, the cast type indicator carried in SCI-2 may be used when selecting the RB set configuration based on the indication status (e.g., may be based on SCI-2). To ensure receiving SCI-2, the SCI-2 may be transmitted in the minimum RB sets (e.g., the minimum RB set configurations).

Another option may include the Tx UE configuring and transmitting or otherwise providing SCI message(s) to indicate the RB set configuration to the Rx UE. That is, the Tx UE may use SCI-1 and/or SCI-2 to explicitly indicate which among the three RB set configuration modes is being used/selected. In one example, this may include a two-bit field in SCI-1/2 being used to explicitly indicate which mode (e.g., RB set configuration) the Tx UE will apply for the sidelink transmissions (e.g., when all three modes are supported). Another option may include a one-bit field in SCI-1/2 being used to explicitly indicate which mode is applied when two modes are supported (e.g., between the minimum RB set configuration and the Rx-centric RB set configuration).

As discussed above, different UE may be using different sets of RB sets. In a first option and in the Tx-centric RB set configuration scenario, the Tx UE may transmit over (e.g., perform the sidelink communication) a set of RB sets within its active BWP. If a Rx UE covers these RB sets in the Tx UE's active BWP (e.g., monitors those RBs), the Rx UE may receive the sidelink transmission. If the Rx UE only covers a subset of the RB sets in the Tx UE's active BWP, the reception may be possible, though the RB sets that fall within the Rx UE's active BWP may be received.

In a second option and for the Rx-centric RB set configuration scenario, the Tx UE may transmit over the set of RB sets within the Rx UE's active BWP (e.g., for unicast sidelink transmission types to the Rx UE). The Rx UE may receive the sidelink transmission as normal in this scenario (e.g., based on monitoring its own active BWP). If the set of RB sets of the Tx UE and the set of RB sets of the Rx UE are not exactly the same (e.g., may partially overlap, but not fully, in the frequency domain), the Tx UE may confine the unicast sidelink communications within the set of RB sets that the Rx UE is able to receive.

In some examples, the Rx UE may be unaware of the RB set configuration of the Tx UE. If the Tx UE doesn't confine the sidelink transmission within the minimum RB-set configuration when the RB-set configuration is unknown, there may be additional considerations supported for the Rx UE. For example, the Rx UE may not yet have received the RB set configuration of the Tx UE. For some of the subchannel (interlaces), the exact set of RBs covered by the FDRA may not be known. Accordingly, there may be some uncertain RBs at either end of the interlace (e.g., edge RBs).

In one option, the Rx UE may ignore the differences (e.g., the unknown RB set configuration of the Tx UE) and continue attempting to decode the sidelink communications using the RB set configuration of the Rx UE. That is, the RX UE may still try to decode the sidelink communications using certain assumption, such as regarding rate matching, using its own RB set definition/configuration or some default values. If the RB set configuration does not match, the decoding attempt may fail. Accordingly, inter-working may be an issue when the RB set configurations between the Tx UE and the Rx UE are not matching.

In another option, the Tx UE may indicate the RB set configuration in SCI-1. For example, the Tx UE may indicate the starting RB and number of RBs of the RB set in SCI-1, the number of un-used RBs on two edges of the interlace, and the like, at the cost of larger SCI-1 payload. One out of a few combinations may be (pre)defined (e.g., per subband). After decoding SCI-1, the Rx UE identifies the set of RBs for the PSSCH transmission and can therefore perform DMRS based channel estimation and decode SCI-2 successfully. In some aspects, the Rx UE may, for SCI-2 decoding, rate match into the whole RB set.

In another option, the Tx UE may indicate the RB set configuration in SCI-2. SCI-2 payload is generally not as expensive as the SCI-1 payload. However, the downside is for SCI-2 decoding, it may not depend on the RB set definition/configuration (e.g., the Rx UE may use that SCI-2 rate matched into the minimum RB set configuration). In some aspects, there may still difficulty in two rounds of DMRS channel estimation.

Aspects of the techniques described herein may also address SCI-1 size alignment considerations. To support inter-working, it is preferred for SCI-1 to be decodable without excessive configurations. The optimized SCI-1 design may depend on the RB set configuration (e.g., how many RB sets there are), but a variable SCI-1 size may interfere with interworking because the Rx UE may assume an SCI-1 size for decoding that is incorrect.

Accordingly, in some examples the Tx UE may transmit or otherwise provide a SCI-1 message to the Rx UE carrying or otherwise conveying an indication of a FDRA and the Rx UE may identify the RB set configuration based on the FDRA indication. That is, for the FDRA field indicated in SCI-1, the Rx UE may assume the worst case number of RB sets (4 or 5 RB sets may depend on the maximum bandwidth supported being 80 or 100 MHz, respectively). In the situation where there are less RB sets being used by the Tx UE, even if the sidelink transmission is confined within a single RB set (e.g., in the case for RMSI/discovery signal transmission), the FDRA can use the same structure as if there are 4/5 RB sets, but just conveying an indication that the resource allocation is confined within a single RB set.

Aspects of the techniques may include a RB set mode switch for sidelink communications in some examples. The mode switch may be between the minimum RB set configuration 905, the Tx-centric RB set configuration 910, and the Rx-centric RB set configuration 915. Generally, this may include the Tx UE identifying or otherwise determining an updated type of sidelink communications to be performed (e.g., subsequent sidelink communications) and transitioning from the RB set configuration to the updated RB set configuration for the subsequent sidelink communications.

That is, aspects of the techniques described herein address the situation where the Tx UE may switch among the Tx-centric, the Rx-centric, and the minimum RB set configurations when each mode is supported. For example, the Tx UE may switch among three RB-set configuration modes based on cast-type and whether the link dependent RB-set configuration is established. At initial set-up, the Tx UE and the Rx UE may both assume minimum RB set configuration 905 and communicate afterward using the Tx-centric RB set configuration 910 (e.g., the updated RB set configuration) signaled via RMSI/SIB/RRC messages, and the Rx-centric RB set configuration via RRC message exchanges per link (e.g., per Rx UE). For broadcast/groupcast sidelink communications, the Tx UE may choose to stay within the minimum RB set configuration 905 or switch to the Tx-centric RB set configuration 910. For the next unicast sidelink transmission and if the per link Rx-centric RB set configuration 915 is available, the Tx UE may switch to the Rx-centric RB set configuration 915. Otherwise, the Tx UE may fall back to the minimum RB set configuration 905.

For the next groupcast/broadcast, if the Tx-centric RB set configuration 910 is available for the target Rx UE, the Tx UE may stay in the Tx-centric RB set configuration 910. Otherwise, the Tx UE may fall back to the minimum RB set configuration 905. For unicast sidelink communication, the Tx UE may choose to stay with the minimum RB set configuration 905 or switch to per-link Rx-centric RB set configuration 915. For the next unicast sidelink transmission, the Tx UE may fall back to the minimum RB set configuration 905 if the Rx-centric RB set configuration 915 for the target Rx UE is not configured. Otherwise, the Tx UE may stay with the minimum RB set configuration 905. For the next groupcast sidelink transmission, if the Tx-centric RB set configuration 910 is available, the Tx UE may switch to the Tx-centric RB set configuration 910. Otherwise, the Tx UE may fall back to the minimum RB set configuration 905.

Figure 10:
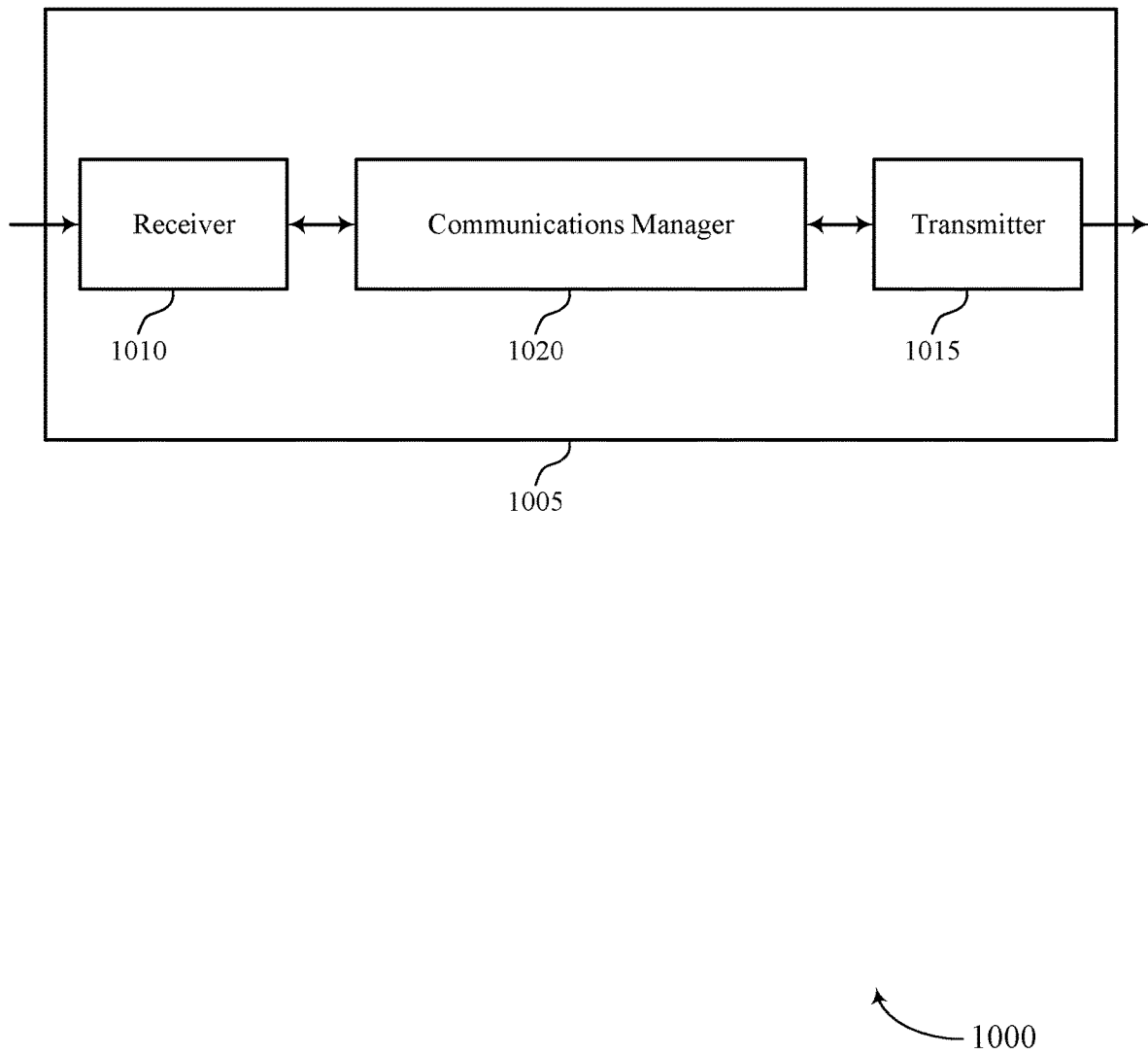
FIGS. 10 and 11 show block diagrams of devices that support transmit or receive centric FDRA in accordance with one or more aspects of the present disclosure.

FIG. 10 shows a block diagram 1000 of a device 1005 that supports transmit or receive centric FDRA in accordance with one or more aspects of the present disclosure. The device 1005 may be an example of aspects of a UE 115 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the RB set configuration mode indication features discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to transmit or receive centric FDRA). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to transmit or receive centric FDRA). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of transmit or receive centric FDRA as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. For example, the communications manager 1020 may be configured as or otherwise support a means for transmitting signaling that includes an indication of a RB set configuration to one or more sidelink UE, the RB set configuration based on a type of sidelink communications to be performed and from a set of available RB set configurations that includes at least a minimum overlapping frequency RB set configuration. The communications manager 1020 may be configured as or otherwise support a means for performing the sidelink communications with the one or more sidelink UE according to the RB set configuration.

Additionally, or alternatively, the communications manager 1020 may support wireless communication at a UE in accordance with examples as disclosed herein. For example, the communications manager 1020 may be configured as or otherwise support a means for receiving signaling that includes, based on a type of sidelink communications to be performed, an indication of a RB set configuration from a set of available RB set configurations, the set of available RB set configurations including at least a minimum overlapping frequency RB set configuration. The communications manager 1020 may be configured as or otherwise support a means for performing the sidelink communications with a transmitting sidelink UE according to the RB set configuration.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for improved FDRA configuration/interpretation based on Tx-centric, Rx-centric, or minimum RB set configurations.

Figure 11:
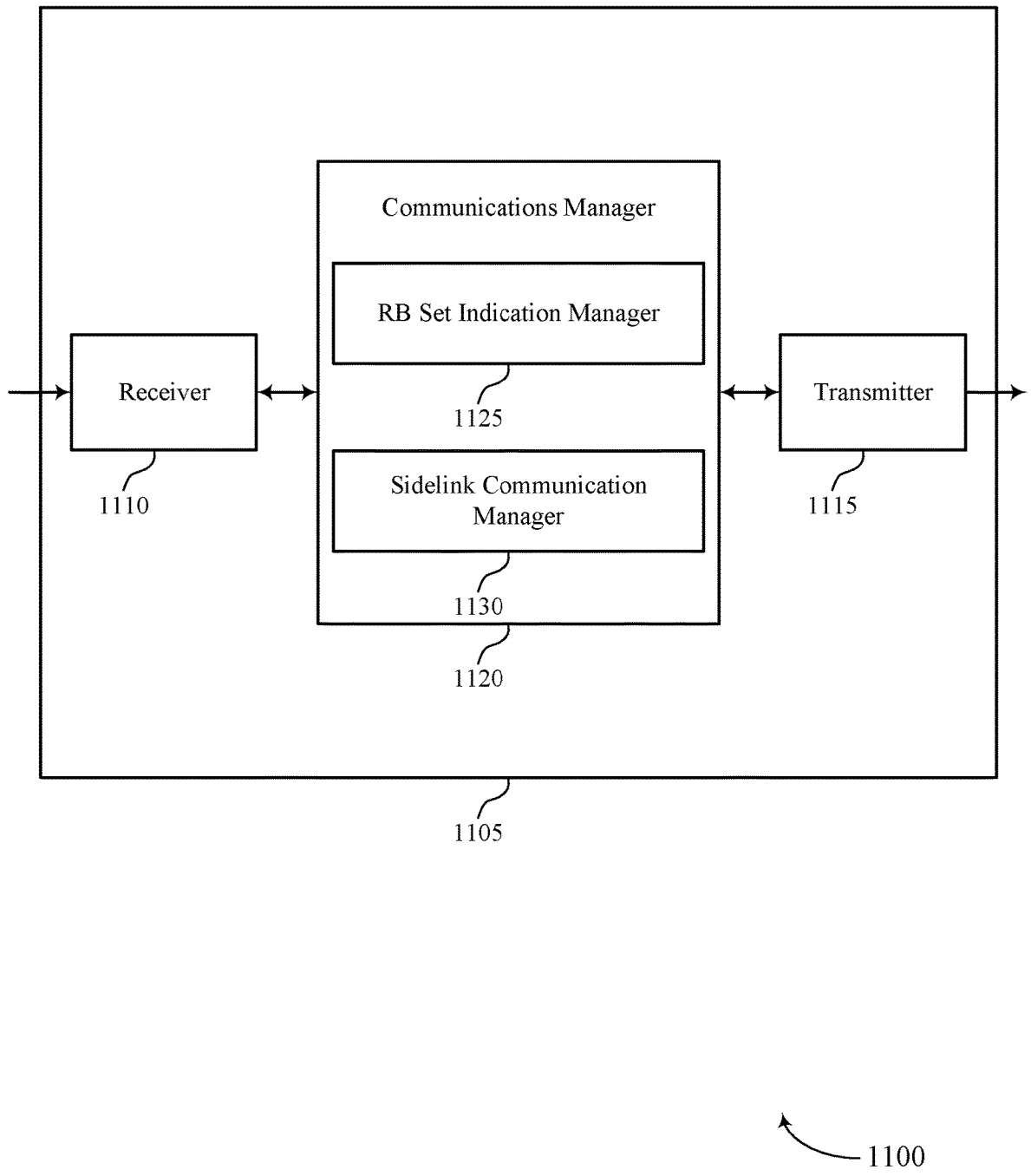

FIG. 11 shows a block diagram 1100 of a device 1105 that supports transmit or receive centric FDRA in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the RB set configuration mode indication features discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to transmit or receive centric FDRA). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to transmit or receive centric FDRA). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of transmit or receive centric FDRA as described herein. For example, the communications manager 1120 may include an RB set indication manager 1125 a sidelink communication manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. The RB set indication manager 1125 may be configured as or otherwise support a means for transmitting signaling that includes an indication of a RB set configuration to one or more sidelink UE, the RB set configuration based on a type of sidelink communications to be performed from a set of available RB set configurations that includes at least a minimum overlapping frequency RB set configuration. The sidelink communication manager 1130 may be configured as or otherwise support a means for performing the sidelink communications with the one or more sidelink UE according to the RB set configuration.

Additionally, or alternatively, the communications manager 1120 may support wireless communication at a UE in accordance with examples as disclosed herein. The RB set indication manager 1125 may be configured as or otherwise support a means for receiving signaling that includes, based on a type of sidelink communications to be performed, an indication of a RB set configuration from a set of available RB set configurations, the set of available RB set configurations including at least a minimum overlapping frequency RB set configuration. The sidelink communication manager 1130 may be configured as or otherwise support a means for performing the sidelink communications with a transmitting sidelink UE according to the RB set configuration.

In some cases, the RB set indication manager 1125 and/or the sidelink communication manager 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of RB set indication manager 1125 and/or the sidelink communication manager 1130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
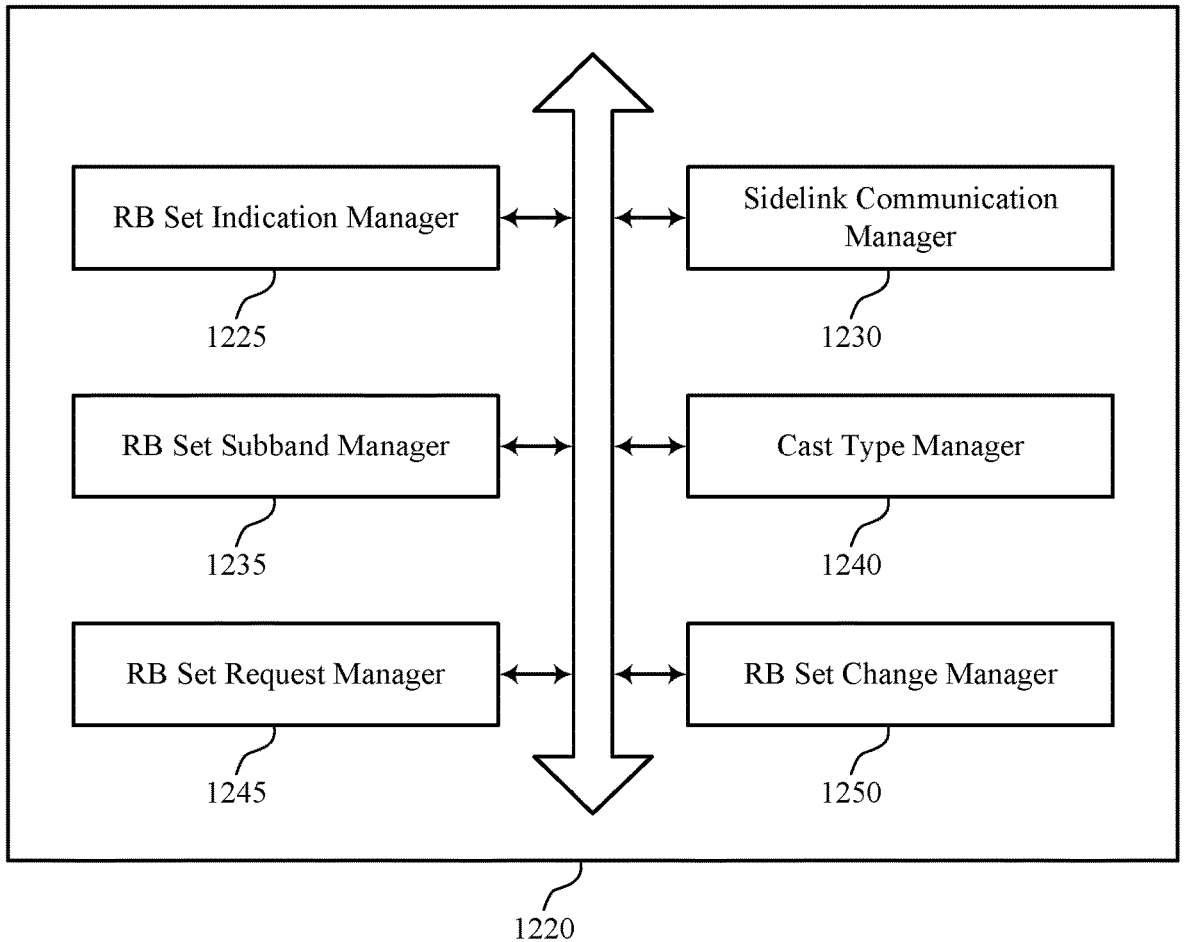
FIG. 12 shows a block diagram of a communications manager that supports transmit or receive centric FDRA in accordance with one or more aspects of the present disclosure.

FIG. 12 shows a block diagram 1200 of a communications manager 1220 that supports transmit or receive centric FDRA in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of transmit or receive centric FDRA as described herein. For example, the communications manager 1220 may include an RB set indication manager 1225, a sidelink communication manager 1230, an RB set subband manager 1235, a cast type manager 1240, an RB set request manager 1245, an RB set change manager 1250, or any combination thereof. Each of these components may communicate, directly or indirectly, with one another (e.g., via one or more buses).

The communications manager 1220 may support wireless communication at a UE in accordance with examples as disclosed herein. The RB set indication manager 1225 may be configured as or otherwise support a means for transmitting signaling that includes an indication of a RB set configuration to one or more sidelink UE, the RB set configuration based on a type of sidelink communications to be performed from a set of available RB set configurations that includes at least a minimum overlapping frequency RB set configuration. The sidelink communication manager 1230 may be configured as or otherwise support a means for performing the sidelink communications with the one or more sidelink UE according to the RB set configuration.

In some examples, the RB set subband manager 1235 may be configured as or otherwise support a means for identifying, within a subband, a set of RBs having frequencies that overlap within each RB set configuration in the set of available RB set configurations. In some examples, the RB set subband manager 1235 may be configured as or otherwise support a means for selecting the set of RBs for the RB set configuration based on the identifying, where the minimum overlapping frequency RB set configuration includes the set of RBs having frequencies that overlap within the subband.

In some examples, performing the sidelink communications includes transmitting a SCI message, a multicast message, a groupcast message, a RRC message, or any combination thereof, using the set of RBs.

In some examples, the RB set subband manager 1235 may be configured as or otherwise support a means for configuring a PSCCH for transmissions within the set of RBs based on the set of RBs having the frequencies that overlap within the subband.

In some examples, the RB set subband manager 1235 may be configured as or otherwise support a means for configuring a portion of a PSSCH for transmissions of a SCI message within the set of RBs based on the set of RBs having the frequencies that overlap within the subband.

In some examples, the cast type manager 1240 may be configured as or otherwise support a means for identifying a set of RBs of the UE available for transmitting a broadcast transmission, a groupcast transmission, or both, where the type of sidelink communications include the broadcast transmission, the groupcast transmission, or both. In some examples, the cast type manager 1240 may be configured as or otherwise support a means for selecting the set of RBs of the UE for the RB set configuration based on the type of sidelink communications, where the set of RBs are associated with a Rx-centric RB set configuration of the set of available RB set configurations.

In some examples, the cast type manager 1240 may be configured as or otherwise support a means for identifying the set of RBs of the UE based on an active BWP of the UE.

In some examples, the RB set request manager 1245 may be configured as or otherwise support a means for receiving, from a sidelink UE, an indication of a requested RB set configuration. In some examples, the RB set request manager 1245 may be configured as or otherwise support a means for selecting the requested RB set configuration as the RB set configuration based on the indication.

In some examples, to support providing the indication, the RB set indication manager 1225 may be configured as or otherwise support a means for identifying, based on the type of sidelink communications to be performed, a RB set configuration indication status for the one or more sidelink UE. In some examples, to support providing the indication, the RB set indication manager 1225 may be configured as or otherwise support a means for selecting the minimum overlapping frequency RB set configuration as the RB set configuration based on the RB set configuration indication status.

In some examples, to support providing the indication, the RB set indication manager 1225 may be configured as or otherwise support a means for configuring one or more SCI messages to indicate the RB set configuration, wherein the signaling comprises the one or more SCI messages.

In some examples, the RB set change manager 1250 may be configured as or otherwise support a means for determining an updated type of sidelink communications to be performed for subsequent sidelink communications to be performed. In some examples, the RB set change manager 1250 may be configured as or otherwise support a means for transitioning from the RB set configuration to an updated RB set configuration for the subsequent sidelink communications based on the updated type of sidelink communications.

In some examples, the type of sidelink communications being performed includes at least one of a unicast sidelink communication, a broadcast sidelink communication, a groupcast sidelink communication, a multicast sidelink communication, or a combination thereof.

Additionally, or alternatively, the communications manager 1220 may support wireless communication at a UE in accordance with examples as disclosed herein. In some examples, the RB set indication manager 1225 may be configured as or otherwise support a means for receiving signaling that includes, based on a type of sidelink communications to be performed, an indication of a RB set configuration from a set of available RB set configurations, the set of available RB set configurations including at least a minimum overlapping frequency RB set configuration. In some examples, the sidelink communication manager 1230 may be configured as or otherwise support a means for performing the sidelink communications with a transmitting sidelink UE according to the RB set configuration.

In some examples, the RB set subband manager 1235 may be configured as or otherwise support a means for determining, based on the indication, a set of RBs in the RB set configuration having frequencies that overlap within each RB set configuration in the set of available RB set configurations. In some examples, performing the sidelink communications includes receiving a SCI message, a multicast message, a groupcast message, a RRC message, or any combination thereof, using the set of RBs. In some examples, a physical sidelink control channel is configured for transmissions within the set of RBs based on the set of RBs having the frequencies that overlap within a subband. In some examples, a portion of a physical sidelink shared channel is configured for transmissions of a SCI message within the set of RBs based on the set of RBs having the frequencies that overlap within a subband.

In some examples, the RB set subband manager 1235 may be configured as or otherwise support a means for rate matching, for a SCI-2 message, frequency resources around interlaces across one or more RB sets indicated in a SCI-1 message.

In some examples, the RB set subband manager 1235 may be configured as or otherwise support a means for rate matching frequency resources around the set of RBs to receive a SCI-2 message, where the frequency resources are used to receive a SCI-1 message.

In some examples, the RB set subband manager 1235 may be configured as or otherwise support a means for rate matching frequency resources around the sets of RBs to receive a PSSCH.

In some examples, the RB set subband manager 1235 may be configured as or otherwise support a means for rate matching frequency resources around expanded RB sets after the received signal indicates the RB set configuration have overlapping frequencies.

In some examples, the cast type manager 1240 may be configured as or otherwise support a means for identifying a set of RBs of the transmitting sidelink UE available for transmitting a broadcast transmission, a groupcast transmission, or both, where the type of sidelink communications include the broadcast transmission, the groupcast transmission, or both. In some examples, the cast type manager 1240 may be configured as or otherwise support a means for performing the sidelink communications using the set of RBs of the transmitting sidelink UE for the RB set configuration based on the type of sidelink communications, where the set of RBs are associated with a Tx-centric RB set configuration of the set of available RB set configurations. In some examples, the set of RBs of the transmitting sidelink UE are based on an active BWP of the Tx UE.

In some examples, to support obtaining the indication, the cast type manager 1240 may be configured as or otherwise support a means for receiving a SCI message indicating an identifier associated with the Tx UE. In some examples, to support obtaining the indication, the cast type manager 1240 may be configured as or otherwise support a means for identifying the RB set configuration based on the identifier.

In some examples, the cast type manager 1240 may be configured as or otherwise support a means for determining that the RB set spans frequency resources outside of a configured RB set of the UE. In some examples, the cast type manager 1240 may be configured as or otherwise support a means for puncturing the frequency resource outside of the configured RB set based on the determining.

In some examples, the RB set request manager 1245 may be configured as or otherwise support a means for transmitting, to the transmitting sidelink UE, an indication of a requested RB set configuration, where the RB set configuration include the requested RB set configuration. In some examples, the RB set configuration is based on an active BWP of the UE. In some examples, the minimum overlapping frequency RB set configuration is selected as the RB set configuration based on a RB set configuration indication status of the UE.

In some examples, to support obtaining the indication, the RB set indication manager 1225 may be configured as or otherwise support a means for receiving one or more SCI messages indicating the RB set configuration. In some examples, the type of sidelink communications being performed includes at least one of a unicast sidelink communication, a broadcast sidelink communication, a groupcast sidelink communication, a multicast sidelink communication, or a combination thereof.

In some examples, to support obtaining the indication, the RB set indication manager 1225 may be configured as or otherwise support a means for receiving a SCI-1 message indicating a FDRA. In some examples, to support obtaining the indication, the RB set indication manager 1225 may be configured as or otherwise support a means for identifying the RB set configuration based on the FDRA.

In some cases, the RB set indication manager 1225, sidelink communication manager 1230, RB set subband manager 1235, cast type manager 1240, RB set request manager 1245, and/or RB set change manager 1250 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of RB set indication manager 1225, sidelink communication manager 1230, RB set subband manager 1235, cast type manager 1240, RB set request manager 1245, and/or RB set change manager 1250 discussed herein.

Figure 13:
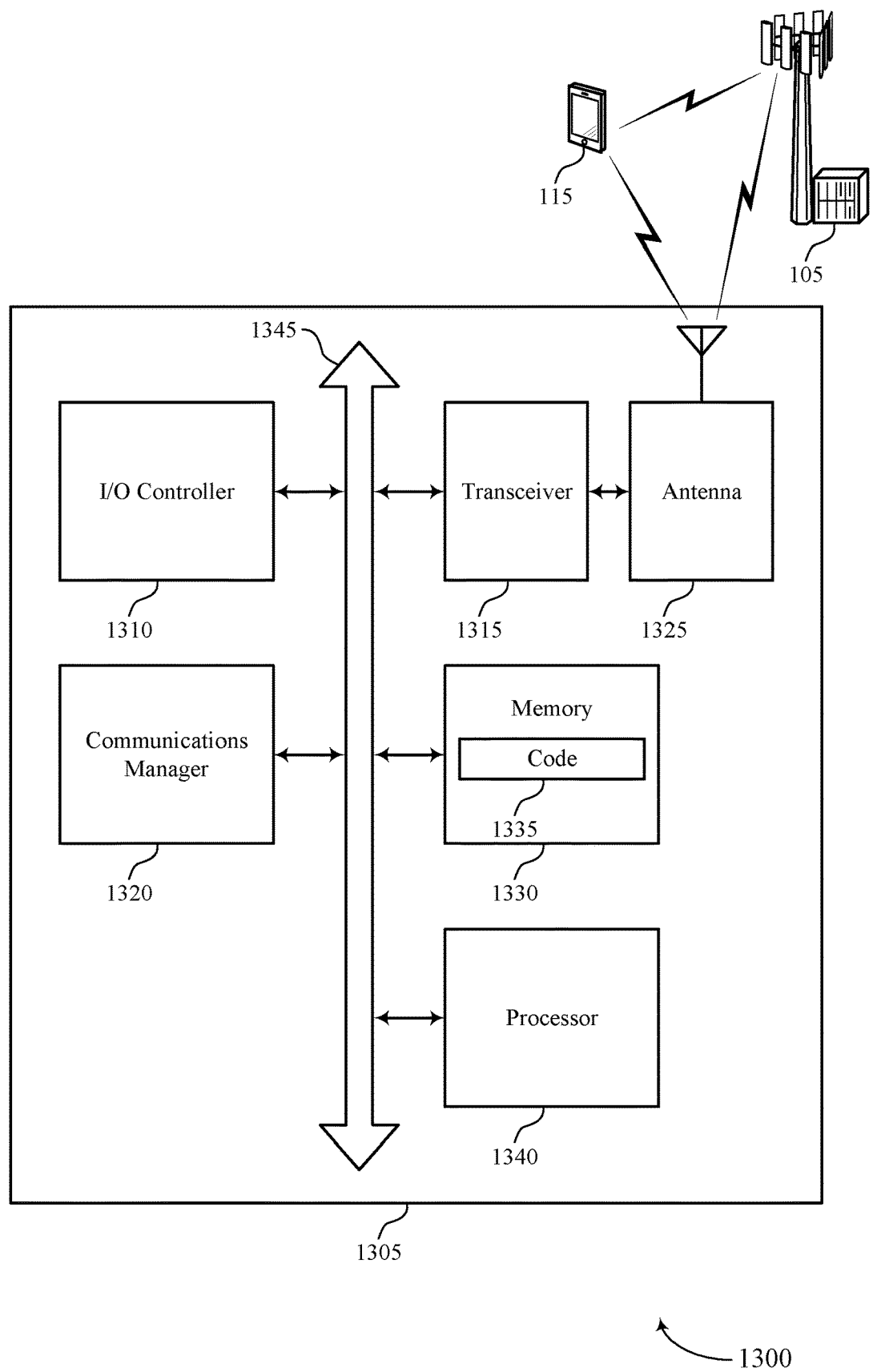
FIG. 13 shows a diagram of a system including a device that supports transmit or receive centric FDRA in accordance with one or more aspects of the present disclosure.

FIG. 13 shows a diagram of a system 1300 including a device 1305 that supports transmit or receive centric FDRA in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting transmit or receive centric FDRA). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for transmitting signaling that includes an indication of a RB set configuration to one or more sidelink UE, the RB set configuration based on a type of sidelink communications to be performed from a set of available RB set configurations that includes at least a minimum overlapping frequency RB set configuration. The communications manager 1320 may be configured as or otherwise support a means for performing the sidelink communications with the one or more sidelink UE according to the RB set configuration.

Additionally, or alternatively, the communications manager 1320 may support wireless communication at a UE in accordance with examples as disclosed herein. For example, the communications manager 1320 may be configured as or otherwise support a means for receiving signaling that includes, based on a type of sidelink communications to be performed, an indication of a RB set configuration from a set of available RB set configurations, the set of available RB set configurations including at least a minimum overlapping frequency RB set configuration. The communications manager 1320 may be configured as or otherwise support a means for performing the sidelink communications with a transmitting sidelink UE according to the RB set configuration.

By including or configuring the communications manager 1320 in accordance with examples as described herein, the device 1305 may support techniques for improved FDRA configuration/interpretation based on Tx-centric, Rx-centric, or minimum RB set configurations.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of transmit or receive centric FDRA as described herein, or the processor 1340 and the memory 1330 may be otherwise configured to perform or support such operations.

Figure 14:
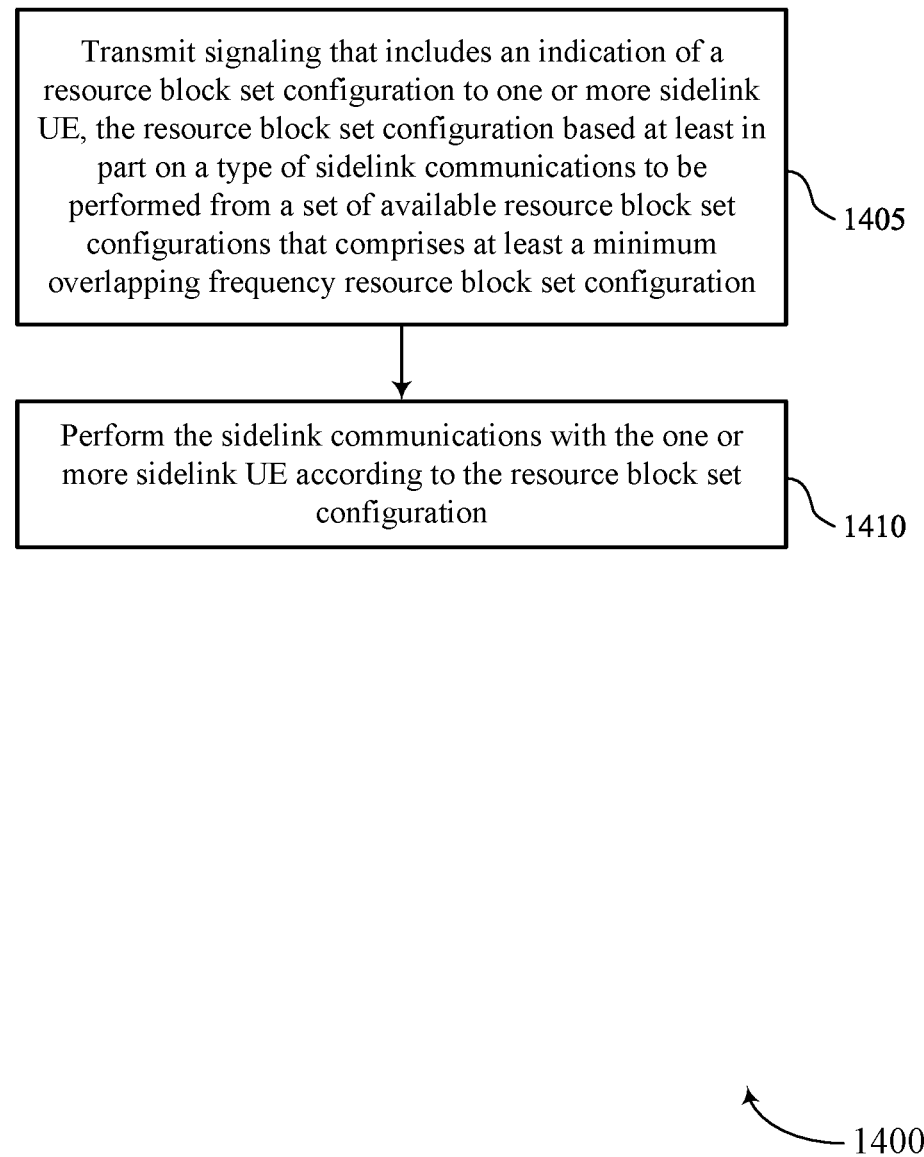
FIGS. 14 through 17 show flowcharts illustrating methods that support transmit or receive centric FDRA in accordance with one or more aspects of the present disclosure.

FIG. 14 shows a flowchart illustrating a method 1400 that supports transmit or receive centric FDRA in accordance with one or more aspects of the present disclosure. The operations of the method 1400 may be implemented by a UE or its components as described herein. For example, the operations of the method 1400 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1405, the method may include transmitting signaling that includes an indication of a RB set configuration to one or more sidelink UE, the RB set configuration based on a type of sidelink communications to be performed from a set of available RB set configurations that includes at least a minimum overlapping frequency RB set configuration. The operations of 1405 may be performed in accordance with examples as disclosed herein. In some examples, aspects of the operations of 1405 may be performed by an RB set indication manager 1225 as described with reference to FIG. 12.

At 1410, the method may include performing the sidelink communications with the one or more sidelink UE according to the RB set configuration. The operations of 1410 may be performed in accordance with examples as disclosed herein. In some examples, aspects of the operations of 1410 may be performed by a sidelink communication manager 1230 as described with reference to FIG. 12.

Figure 15:
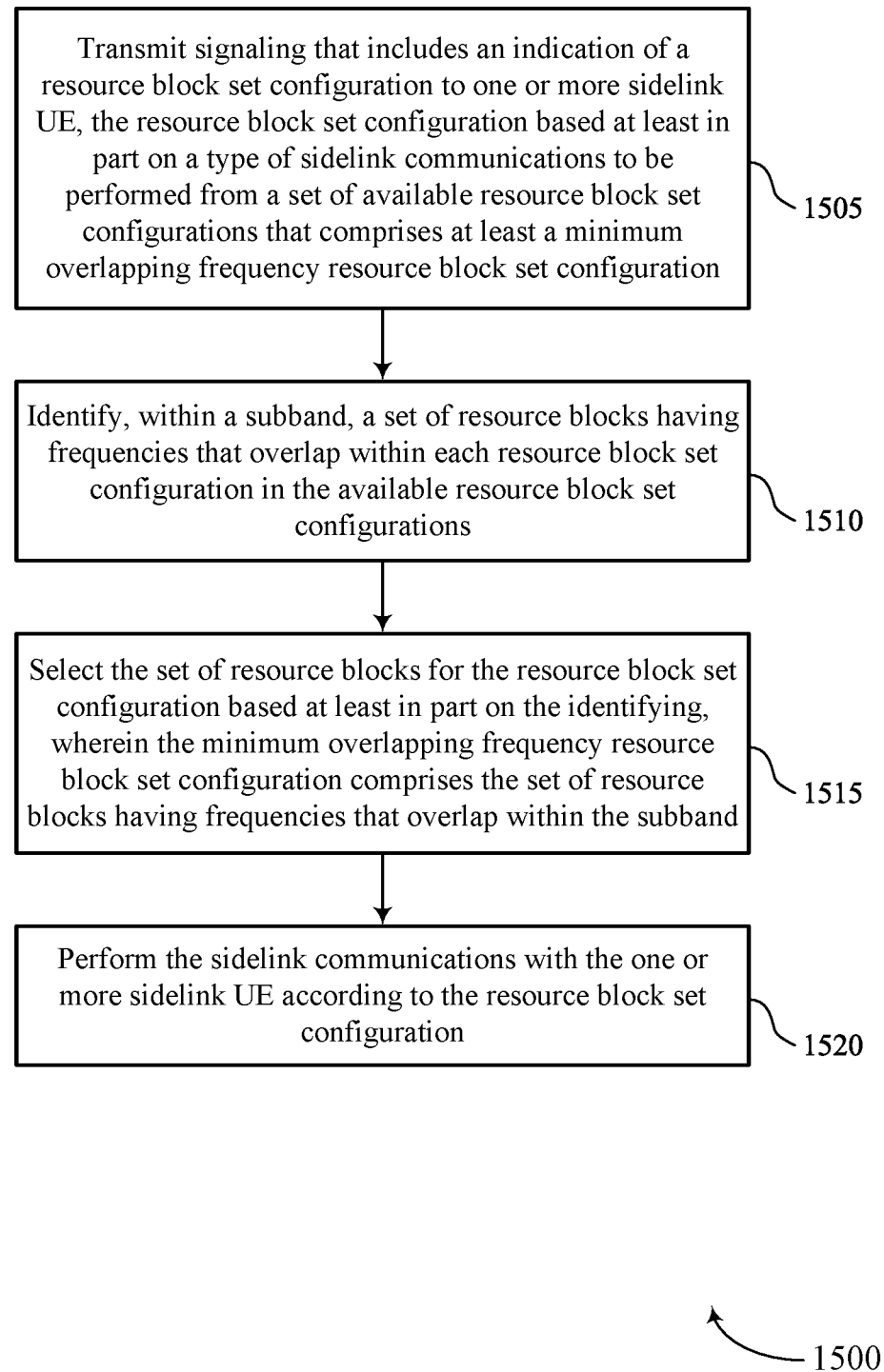

FIG. 15 shows a flowchart illustrating a method 1500 that supports transmit or receive centric FDRA in accordance with one or more aspects of the present disclosure. The operations of the method 1500 may be implemented by a UE or its components as described herein. For example, the operations of the method 1500 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1505, the method may include transmitting signaling that includes an indication of a RB set configuration to one or more sidelink UE, the RB set configuration based on a type of sidelink communications to be performed from a set of available RB set configurations that includes at least a minimum overlapping frequency RB set configuration. The operations of 1505 may be performed in accordance with examples as disclosed herein. In some examples, aspects of the operations of 1505 may be performed by an RB set indication manager 1225 as described with reference to FIG. 12.

At 1510, the method may include identifying, within a subband, a set of RBs having frequencies that overlap within each RB set configuration in the available RB set configurations. The operations of 1510 may be performed in accordance with examples as disclosed herein. In some examples, aspects of the operations of 1510 may be performed by an RB set subband manager 1235 as described with reference to FIG. 12.

At 1515, the method may include selecting the set of RBs for the RB set configuration based on the identifying, where the minimum overlapping frequency RB set configuration includes the set of RBs having frequencies that overlap within the subband. The operations of 1515 may be performed in accordance with examples as disclosed herein. In some examples, aspects of the operations of 1515 may be performed by an RB set subband manager 1235 as described with reference to FIG. 12.

At 1520, the method may include performing the sidelink communications with the one or more sidelink UE according to the RB set configuration. The operations of 1520 may be performed in accordance with examples as disclosed herein. In some examples, aspects of the operations of 1520 may be performed by a sidelink communication manager 1230 as described with reference to FIG. 12.

Figure 16:
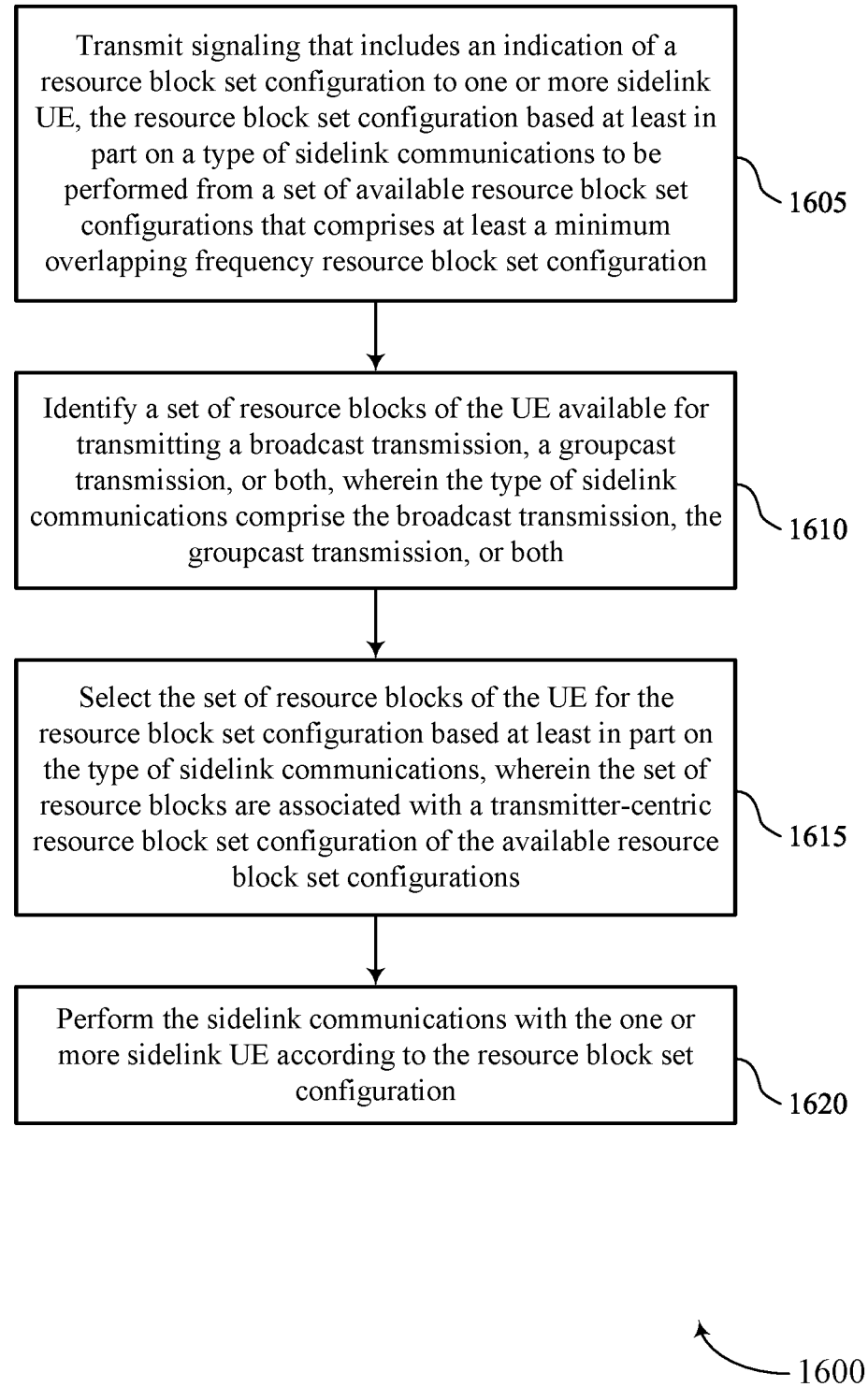

FIG. 16 shows a flowchart illustrating a method 1600 that supports transmit or receive centric FDRA in accordance with one or more aspects of the present disclosure. The operations of the method 1600 may be implemented by a UE or its components as described herein. For example, the operations of the method 1600 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1605, the method may include transmitting signaling that includes an indication of a RB set configuration to one or more sidelink UE, the RB set configuration based on a type of sidelink communications to be performed from a set of available RB set configurations that includes at least a minimum overlapping frequency RB set configuration. The operations of 1605 may be performed in accordance with examples as disclosed herein. In some examples, aspects of the operations of 1605 may be performed by an RB set indication manager 1225 as described with reference to FIG. 12.

At 1610, the method may include identifying a set of RBs of the UE available for transmitting a broadcast transmission, a groupcast transmission, or both, where the type of sidelink communications include the broadcast transmission, the groupcast transmission, or both. The operations of 1610 may be performed in accordance with examples as disclosed herein. In some examples, aspects of the operations of 1610 may be performed by a cast type manager 1240 as described with reference to FIG. 12.

At 1615, the method may include selecting the set of RBs of the UE for the RB set configuration based on the type of sidelink communications, where the set of RBs are associated with a Tx-centric RB set configuration of the available RB set configurations. The operations of 1615 may be performed in accordance with examples as disclosed herein. In some examples, aspects of the operations of 1615 may be performed by a cast type manager 1240 as described with reference to FIG. 12.

At 1620, the method may include performing the sidelink communications with the one or more sidelink UE according to the RB set configuration. The operations of 1620 may be performed in accordance with examples as disclosed herein. In some examples, aspects of the operations of 1620 may be performed by a sidelink communication manager 1230 as described with reference to FIG. 12.

Figure 17:
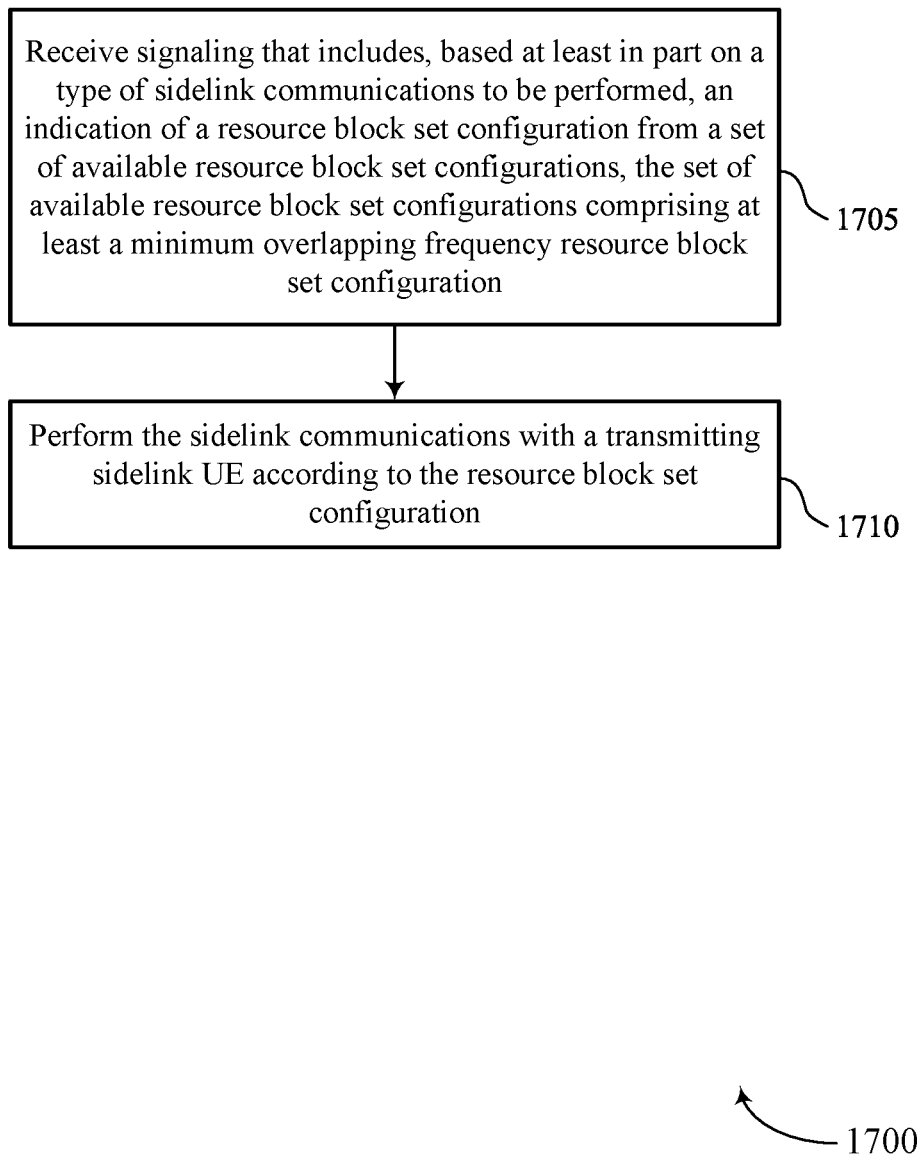

FIG. 17 shows a flowchart illustrating a method 1700 that supports transmit or receive centric FDRA in accordance with one or more aspects of the present disclosure. The operations of the method 1700 may be implemented by a UE or its components as described herein. For example, the operations of the method 1700 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1705, the method may include receiving signaling that includes, based on a type of sidelink communications to be performed, an indication of a RB set configuration from a set of available RB set configurations, the set of available RB set configurations including at least a minimum overlapping frequency RB set configuration. The operations of 1705 may be performed in accordance with examples as disclosed herein. In some examples, aspects of the operations of 1705 may be performed by an RB set indication manager 1225 as described with reference to FIG. 12.

At 1710, the method may include performing the sidelink communications with a transmitting sidelink UE according to the RB set configuration. The operations of 1710 may be performed in accordance with examples as disclosed herein. In some examples, aspects of the operations of 1710 may be performed by a sidelink communication manager 1230 as described with reference to FIG. 12.

The following provides an overview of aspects of the present disclosure:

Aspect 1: A method for wireless communication at a UE, comprising: transmitting signaling that includes an indication of a RB set configuration to one or more sidelink UE, the RB set configuration based at least in part on a type of sidelink communications to be performed and from a set of available RB set configurations that comprises at least a minimum overlapping frequency RB set configuration; and performing the sidelink communications with the one or more sidelink UE according to the RB set configuration.

Aspect 2: The method of aspect 1, further comprising: identifying, within a subband, a set of RBs having frequencies that overlap within each RB set configuration in the available RB set configurations; and selecting the set of RBs for the RB set configuration based at least in part on the identifying, wherein the minimum overlapping frequency RB set configuration comprises the set of RBs having frequencies that overlap within the subband.

Aspect 3: The method of aspect 2, wherein performing the sidelink communications comprises transmitting a SCI message, a multicast message, a groupcast message, a RRC message, or any combination thereof, using the set of RBs.

Aspect 4: The method of any of aspects 2 through 3, further comprising: configuring a PSCCH for transmissions within the set of RBs based at least in part on the set of RBs having the frequencies that overlap within the subband.

Aspect 5: The method of any of aspects 2 through 4, further comprising: configuring a portion of a PSSCH for transmissions of a SCI message within the set of RBs based at least in part on the set of RBs having the frequencies that overlap within the subband.

Aspect 6: The method of any of aspects 1 through 5, further comprising: identifying a set of RBs of the UE available for transmitting a broadcast transmission, a groupcast transmission, or both, wherein the type of sidelink communications comprise the broadcast transmission, the groupcast transmission, or both; and selecting the set of RBs of the UE for the RB set configuration based at least in part on the type of sidelink communications, wherein the set of RBs are associated with a transmitter-centric RB set configuration of the available RB set configurations.

Aspect 7: The method of aspect 6, further comprising: identifying the set of RBs of the UE based at least in part on an active bandwidth part of the UE.

Aspect 8: The method of any of aspects 1 through 7, further comprising: receiving, from a sidelink UE, an indication of a requested RB set configuration; and selecting the requested RB set configuration as the RB set configuration based at least in part on the indication.

Aspect 9: The method of any of aspects 1 through 8, wherein providing the indication comprises: identifying, based at least in part on the type of sidelink communications to be performed, a RB set configuration indication status for the one or more sidelink UE; and selecting the minimum overlapping frequency RB set configuration as the RB set configuration based at least in part on the RB set configuration indication status.

Aspect 10: The method of any of aspects 1 through 9, wherein providing the indication comprises: configuring one or more SCI messages to indicate the RB set configuration, wherein the signaling comprises the one or more SCI messages.

Aspect 11: The method of any of aspects 1 through 10, further comprising: determining an updated type of sidelink communications to be performed for subsequent sidelink communications to be performed; and transitioning from the RB set configuration to an updated RB set configuration for the subsequent sidelink communications based at least in part on the updated type of sidelink communications.

Aspect 12: The method of any of aspects 1 through 11, wherein the type of sidelink communications being performed comprises at least one of a unicast sidelink communication, a broadcast sidelink communication, a groupcast sidelink communication, a multicast sidelink communication, or a combination thereof.

Aspect 13: A method for wireless communication at a UE, comprising: receiving signaling that includes, based at least in part on a type of sidelink communications to be performed, an indication of a RB set configuration from a set of available RB set configurations, the set of available RB set configurations comprising at least a minimum overlapping frequency RB set configuration; and performing the sidelink communications with a transmitting sidelink UE according to the RB set configuration.

Aspect 14: The method of aspect 13, further comprising: determining, based at least in part on the indication, a set of RBs in the RB set configuration having frequencies that overlap within each RB set configuration in the available RB set configurations.

Aspect 15: The method of aspect 14, wherein performing the sidelink communications comprises receiving a SCI message, a multicast message, a groupcast message, a RRC message, or any combination thereof, using the set of RBs.

Aspect 16: The method of any of aspects 14 through 15, wherein a PSCCH is configured for transmissions within the set of RBs based at least in part on the set of RBs having the frequencies that overlap within a subband.

Aspect 17: The method of any of aspects 14 through 16, wherein a portion of a PSSCH is configured for transmissions of a SCI message within the set of RBs based at least in part on the set of RBs having the frequencies that overlap within a subband.

Aspect 18: The method of aspect 17, further comprising: rate matching, for a SCI two message, frequency resources around interlaces across one or more RB sets indicated in a SCI one message.

Aspect 19: The method of any of aspects 17 through 18, further comprising: rate matching frequency resources around the set of RBs to receive a SCI two message, wherein the frequency resources are used to receive a SCI one message.

Aspect 20: The method of any of aspects 17 through 19, further comprising: rate matching frequency resources around the sets of RBs to receive a PSSCH.

Aspect 21: The method of any of aspects 14 through 20, further comprising: rate matching frequency resources around expanded RB sets after the received signal indicates the RB set configuration have overlapping frequencies.

Aspect 22: The method of any of aspects 13 through 21, further comprising: identifying a set of RBs of the transmitting sidelink UE available for transmitting a broadcast transmission, a groupcast transmission, or both, wherein the type of sidelink communications comprise the broadcast transmission, the groupcast transmission, or both; and performing the sidelink communications using the set of RBs of the transmitting sidelink UE for the RB set configuration based at least in part on the type of sidelink communications, wherein the set of RBs are associated with a transmitter-centric RB set configuration of the available RB set configurations.

Aspect 23: The method of aspect 22, wherein the set of RBs of the transmitting sidelink UE are based at least in part on an active bandwidth part of the transmitting sidelink UE.

Aspect 24: The method of any of aspects 22 through 23, wherein obtaining the indication comprises: receiving a SCI message indicating an identifier associated with the transmitting sidelink UE; and identifying the RB set configuration based at least in part on the identifier.

Aspect 25: The method of any of aspects 22 through 24, further comprising: determining that the RB set spans frequency resources outside of a configured RB set of the UE; and puncturing the frequency resource outside of the configured RB set based at least in part on the determining.

Aspect 26: The method of any of aspects 13 through 25, further comprising: transmitting, to the transmitting sidelink UE, an indication of a requested RB set configuration, wherein the RB set configuration comprise the requested RB set configuration.

Aspect 27: The method of aspect 26, wherein the RB set configuration is based at least in part on an active bandwidth part of the UE.

Aspect 28: The method of any of aspects 13 through 27, wherein the minimum overlapping frequency RB set configuration is selected as the RB set configuration based at least in part on a RB set configuration indication status of the UE.

Aspect 29: The method of any of aspects 13 through 28, wherein obtaining the indication comprises: receiving one or more SCI messages indicating the RB set configuration.

Aspect 30: The method of any of aspects 13 through 29, wherein the type of sidelink communications being performed comprises at least one of a unicast sidelink communication, a broadcast sidelink communication, a groupcast sidelink communication, a multicast sidelink communication, or a combination thereof.

Aspect 31: The method of any of aspects 13 through 30, wherein obtaining the indication comprises: receiving a SCI one message indicating a frequency domain resource allocation; and identifying the RB set configuration based at least in part on the frequency domain resource allocation.

Aspect 32: An apparatus for wireless communication at a UE, comprising a processor; memory coupled with the processor; and instructions stored in the memory and executable by the processor to cause the apparatus to perform a method of any of aspects 1 through 12.

Aspect 33: An apparatus for wireless communication at a UE, comprising at least one means for performing a method of any of aspects 1 through 12.

Aspect 34: A non-transitory computer-readable medium storing code for wireless communication at a UE, the code comprising instructions executable by a processor to perform a method of any of aspects 1 through 12.

Aspect 35: An apparatus for wireless communication at a UE, comprising a processor; memory coupled with the processor; and instructions stored in the memory and executable by the processor to cause the apparatus to perform a method of any of aspects 13 through 31.

Aspect 36: An apparatus for wireless communication at a UE, comprising at least one means for performing a method of any of aspects 13 through 31.

Aspect 37: A non-transitory computer-readable medium storing code for wireless communication at a UE, the code comprising instructions executable by a processor to perform a method of any of aspects 13 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   memory; and
   one or more processors coupled with the memory and configured to cause the apparatus to:
      transmit signaling that includes an indication of a resource block set configuration to one or more sidelink UE, wherein the resource block set configuration is selected based at least in part on a type of sidelink communications to be performed, and wherein the resource block set configuration is selected from a set of available resource block set configurations that comprises at least a minimum overlapping frequency resource block set configuration; and
      perform the sidelink communications with the one or more sidelink UE according to the resource block set configuration.

2. The apparatus of claim 1, wherein the one or more processors are configured to cause the apparatus to:
   identify, within a subband, a set of resource blocks having frequencies that overlap within each resource block set configuration in the set of available resource block set configurations; and
   select the set of resource blocks for the resource block set configuration based at least in part on the identification, wherein the minimum overlapping frequency resource block set configuration comprises the set of resource blocks having frequencies that overlap within the subband.

3. The apparatus of claim 2, wherein the one or more processors are configured to cause the apparatus to transmit a sidelink control information message, a multicast message, a groupcast message, a radio resource control message, or any combination thereof, using the set of resource blocks.

4. The apparatus of claim 2, wherein the one or more processors are configured to cause the apparatus to:
   configure a physical sidelink control channel for transmissions within the set of resource blocks based at least in part on the set of resource blocks having the frequencies that overlap within the subband.

5. The apparatus of claim 2, wherein the one or more processors are configured to cause the apparatus to:
   configure a portion of a physical sidelink shared channel for transmissions of a sidelink control information message within the set of resource blocks based at least in part on the set of resource blocks having the frequencies that overlap within the subband.

6. The apparatus of claim 1, wherein the one or more processors are configured to cause the apparatus to:
   identify a set of resource blocks of the UE available for transmitting a broadcast transmission, a groupcast transmission, or both, wherein the type of sidelink communications comprise the broadcast transmission, the groupcast transmission, or both; and
   select the set of resource blocks of the UE for the resource block set configuration based at least in part on the type of sidelink communications, wherein the set of resource blocks are associated with a transmitter-centric resource block set configuration of the set of available resource block set configurations.

7. The apparatus of claim 6, wherein the one or more processors are configured to cause the apparatus to:
identify the set of resource blocks of the UE based at least in part on an active bandwidth part of the UE.

8. The apparatus of claim 1, wherein the one or more processors are configured to cause the apparatus to:
receive, from a sidelink UE, an indication of a requested resource block set configuration; and
select the requested resource block set configuration as the resource block set configuration based at least in part on the indication.

9. The apparatus of claim 1, wherein the one or more processors are configured to cause the apparatus to:
identify, based at least in part on the type of sidelink communications to be performed, a resource block set configuration indication status for the one or more sidelink UE; and
select the minimum overlapping frequency resource block set configuration as the resource block set configuration based at least in part on the resource block set configuration indication status.

10. The apparatus of claim 1, wherein the one or more processors are configured to cause the apparatus to:
configure one or more sidelink control information messages to indicate the resource block set configuration, wherein the signaling comprises the one or more sidelink control information messages.

11. The apparatus of claim 1, wherein the one or more processors are configured to cause the apparatus to:
determine an updated type of sidelink communications to be performed for subsequent sidelink communications to be performed; and
transition from the resource block set configuration to an updated resource block set configuration for the subsequent sidelink communications based at least in part on the updated type of sidelink communications.

12. The apparatus of claim 1, wherein the type of sidelink communications being performed comprises at least one of a unicast sidelink communication, a broadcast sidelink communication, a groupcast sidelink communication, a multicast sidelink communication, or a combination thereof.

13. The apparatus of claim 1, wherein the minimum overlapping frequency resource block set configuration comprises a numerical quantity of resource blocks that are common among the available resource block set configurations.

14. The apparatus of claim 1, wherein the set of available resource block set configurations also comprises a transmitter-centric resource block set configuration based on a configuration of a transmitting UE, and a receiver-centric resource block set configuration based on a configuration of a receiving UE; and
wherein the one or more processors are configured to cause the apparatus to mode switch among the minimum overlapping frequency resource block set configuration, the transmitter-centric resource block set configuration, and the receiver-centric resource block set configuration based at least in part on the type of sidelink communications to be performed.

15. An apparatus for wireless communication at a user equipment (UE), comprising:
memory; and
one or more processors coupled with the memory and configured to cause the apparatus to:
receive signaling that includes, based at least in part on a type of sidelink communications to be performed, an indication of a resource block set configuration selected from a set of available resource block set configurations, wherein the set of available resource block set configurations comprises at least a minimum overlapping frequency resource block set configuration; and
perform the sidelink communications with a transmitting sidelink UE according to the resource block set configuration.

16. The apparatus of claim 15, wherein the one or more processors are configured to cause the apparatus to:
determine, based at least in part on the indication, a set of resource blocks in the resource block set configuration having frequencies that overlap within each the resource block set configuration in the set of available resource block set configurations.

17. The apparatus of claim 16, wherein the one or more processors are configured to cause the apparatus to receive a sidelink control information message, a multicast message, a groupcast message, a radio resource control message, or any combination thereof, using the set of resource blocks.

18. The apparatus of claim 16, wherein a physical sidelink control channel is configured for transmissions within the set of resource blocks based at least in part on the set of resource blocks having the frequencies that overlap within a subband.

19. The apparatus of claim 16, wherein a portion of a physical sidelink shared channel is configured for transmissions of a sidelink control information message within the set of resource blocks based at least in part on the set of resource blocks having the frequencies that overlap within a subband.

20. The apparatus of claim 19, wherein the one or more processors are configured to cause the apparatus to:
rate match, for a sidelink control information two message, frequency resources around interlaces across one or more resource block sets indicated in a sidelink control information one message.

21. The apparatus of claim 19, wherein the one or more processors are configured to cause the apparatus to:
rate match frequency resources around the set of resource blocks to receive a sidelink control information two message, wherein the frequency resources are used to receive a sidelink control information one message.

22. The apparatus of claim 19, wherein the one or more processors are configured to cause the apparatus to:
rate match frequency resources around the sets of resource blocks to receive a physical sidelink shared channel.

23. The apparatus of claim 16, wherein the one or more processors are configured to cause the apparatus to:
rate match frequency resources around expanded resource block sets after the received signal indicates the resource block set configuration have overlapping frequencies.

24. The apparatus of claim 15, wherein the one or more processors are configured to cause the apparatus to:
identify a set of resource blocks of the transmitting sidelink UE available for transmitting a broadcast transmission, a groupcast transmission, or both, wherein the type of sidelink communications comprise the broadcast transmission, the groupcast transmission, or both; and
perform the sidelink communications using the set of resource blocks of the transmitting sidelink UE for the resource block set configuration based at least in part on the type of sidelink communications, wherein the set of resource blocks are associated with a transmitter-centric resource block set configuration of the set of available resource block set configurations.

25. The apparatus of claim 24, wherein the set of resource blocks of the transmitting sidelink UE are based at least in part on an active bandwidth part of the transmitting sidelink UE.

26. The apparatus of claim 24, wherein the one or more processors are configured to cause the apparatus to:
receive a sidelink control information message indicating an identifier associated with the transmitting sidelink UE; and
identify the resource block set configuration based at least in part on the identifier.

27. The apparatus of claim 24, wherein the one or more processors are configured to cause the apparatus to:
determine that the resource block set configuration spans frequency resources outside of a configured resource block set of the UE; and
puncture the frequency resource outside of the configured resource block set based at least in part on the determination.

28. The apparatus of claim 15, wherein the one or more processors are configured to cause the apparatus to:
transmit, to the transmitting sidelink UE, an indication of a requested resource block set configuration, wherein the resource block set configuration comprises the requested resource block set configuration.

29. A method for wireless communication at a user equipment (UE), comprising:
transmitting signaling that includes an indication of a resource block set configuration to one or more sidelink UE, wherein the resource block set configuration is selected based at least in part on a type of sidelink communications to be performed, and wherein the resource block set configuration is selected from a set of available resource block set configurations that comprises at least a minimum overlapping frequency resource block set configuration; and
performing the sidelink communications with the one or more sidelink UE according to the resource block set configuration.

30. A method for wireless communication at a user equipment (UE), comprising:
receiving signaling that includes, based at least in part on a type of sidelink communications to be performed, an indication of a resource block set configuration selected from a set of available resource block set configurations, wherein the set of available resource block set configurations comprises at least a minimum overlapping frequency resource block set configuration; and
performing the sidelink communications with a transmitting sidelink UE according to the resource block set configuration.

* * * * *